US012794610B2

(12) United States Patent
Knudsen et al.

(10) Patent No.: US 12,794,610 B2
(45) Date of Patent: Nov. 10, 2026

(54) LOW-POWER WIRELESS DEVICE

(71) Applicant: Nokia Technologies Oy, Espoo (FI)

(72) Inventors: Knud Knudsen, Aalborg (DK); Ganesh Venkatraman, Oulu (FI); Esa Tapani Tiirola, Oulu (FI); Jorma Johannes Kaikkonen, Oulu (FI); Jan Torst Hviid, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 18/540,237

(22) Filed: Dec. 14, 2023

(65) Prior Publication Data

US 2024/0283582 A1 Aug. 22, 2024

(30) Foreign Application Priority Data

Feb. 17, 2023 (FI) .................................... 20235192

(51) Int. Cl.
*H04L 5/00* (2006.01)
*H04L 27/26* (2006.01)
*H04W 52/02* (2009.01)

(52) U.S. Cl.
CPC ........ *H04L 5/0007* (2013.01); *H04L 27/2607* (2013.01); *H04W 52/0229* (2013.01)

(58) Field of Classification Search
CPC ........... H04L 27/2602; H04L 27/2662; H04W 52/0225
See application file for complete search history.

(56) References Cited

U.S. PATENT DOCUMENTS

| | | | | |
|---|---|---|---|---|
| 10,129,064 B1 * | 11/2018 | Lee | H04L 27/2607 | |
| 2015/0358102 A1 * | 12/2015 | Ko | H04J 11/0053 | 370/252 |
| 2026/0006553 A1 * | 1/2026 | Wei | H04W 52/0235 | |
| 2026/0012299 A1 * | 1/2026 | Yang | H04L 5/0007 | |

OTHER PUBLICATIONS

"3rd Generation Partnership Project; Technical Specification Group Radio Access Network; NR; Physical channels and modulation (Release 17)", 3GPP TS 38.211, V17.3.0, Sep. 2022, pp. 1-136.
"3rd Generation Partnership Project; Technical Specification Group Radio Access Network; Study on support of reduced capability NR devices (Release 17)", 3GPP TR 38.875, V17.0.0, Mar. 2021, pp. 1-135.

(Continued)

*Primary Examiner* — Nicholas A Jensen
*Assistant Examiner* — Ryan Alexander Crigler
(74) *Attorney, Agent, or Firm* — Lippes Mathias LLP

(57) ABSTRACT

According to an example aspect of the present disclosure, there is provided an apparatus comprising at least one processing core and at least one memory storing instructions that, when executed by the at least one processing core, cause the apparatus at least to determine a bit sequence, divide the bit sequence into fragments of bits, map each fragment of bits to a different orthogonal frequency division multiplexed (OFDM) symbol, encode the fragments using on-off keying or frequency shift keying manipulate the encoded fragments to obtain a cyclic signal for each OFDM symbol and transmit a wakeup signal comprising the manipulated fragments.

20 Claims, 16 Drawing Sheets

(56) References Cited

OTHER PUBLICATIONS

"New SID: Study on low-power Wake-up Signal and Receiver for NR", 3GPP TSG RAN meeting #94e, RP-213645, Agenda: 8A.1, vivo, Dec. 6-17, 2021, 4 pages.

"Motivation for new study item on ultra-low power wake up signal in Rel-18", 3GPP TSG RAN Rel-18 workshop, RWS-210168, Agenda: 4.3, vivo, Jun. 28-Jul. 2, 2021, 13 pages.

"IEEE Standard for Information Technology Telecommunications and Information Exchange between Systems Local and Metropolitan Area Networks-Specific Requirements, Part 11: Wireless LAN Medium Access Control (MAC) and Physical Layer (PHY) Specifications, Amendment 3: Wake-Up Radio Operation", IEEE Computer Society, IEEE Std 802.11ba™M-2021, Mar. 2021, 180 pages.

"Discussion on architecture of LP-WUS receiver", 3GPP TSG RAN WG1 Meeting #111, R1-2210909, Agenda: 9.13.2, Huawei, Nov. 14-18, 2022, 22 pages.

Tervo et al., "On the Potential of Using Sub-THz Frequencies for Beyond 5G", Joint European Conference on Networks and Communications & 6G Summit (EuCNC/6G Summit), Jun. 7-10, 2022, pp. 37-42.

Berardinelli et al., "Zero-tail DFT-spread-OFDM signals", IEEE Globecom Workshops (GC Wkshps), Dec. 9-13, 2013, pp. 229-234.

Office action received for corresponding Finnish Patent Application No. 20235192, dated Aug. 18, 2023, 10 pages.

Rostami et al., "Novel Wake-up Scheme for Energy-Efficient Low-Latency Mobile Devices in 5G Networks", IEEE Transactions on Mobile Computing, vol. 20, No. 4, Apr. 2021, pp. 1511-1528.

Sahin et al., "Sequence-Based OOK for Orthogonal Multiplexing of Wake-up Radio Signals and OFDM Waveforms", IEEE Global Communications Conference (GLOBECOM), Dec. 9-13, 2018, 6 pages.

Lopez et al., "Transmitter Techniques for Multi-Carrier On-Off Keying", IEEE International Conference on Communications (ICC), May 20-24, 2019, 6 pages.

Rostami et al., "Wake-up Radio-Based 5G Mobile Access: Methods, Benefits, and Challenges", IEEE Communications Magazine, vol. 58, No. 7, Jul. 2020, pp. 14-20.

* cited by examiner

LOW-POWER WIRELESS DEVICE

CROSS-REFERENCE TO RELATED APPLICATION

This application claims priority to, and the benefit of, Finnish application No. 20235192 filed on Feb. 17, 2023, which is incorporated herein by reference in its entirety.

FIELD

The present disclosure relates to transmission and reception arrangements in low-power wireless devices.

BACKGROUND

Wireless communication devices may be battery-powered, wherefore optimizing use of battery power has long been an aim in design of such devices. Minimizing power drain increases the time a battery lasts before it needs to be recharged, which enhances the usability of the overall system as a more diverse set of use cases is enabled.

While personal communication devices, such as smartphones, may be recharged every few days, there are different wireless device types which are challenging to recharge frequently. For example, sensor devices installed in vehicles or buildings may be configured to provide information on liquid flow or temperature readings, or trigger fire alarms, for example, such that they aim to be powered by a stable power source, or a very long-lasting rechargeable or replaceable battery.

SUMMARY

According to some aspects, there is provided the subject-matter of the independent claims. Some embodiments are defined in the dependent claims. The scope of protection sought for various embodiments of the disclosure is set out by the independent claims. The embodiments, examples and features, if any, described in this specification that do not fall under the scope of the independent claims are to be interpreted as examples useful for understanding various embodiments of the disclosure.

According to a first aspect of the present disclosure, there is provided an apparatus comprising at least one processing core and at least one memory storing instructions that, when executed by the at least one processing core, cause the apparatus at least to determine a bit sequence, divide the bit sequence into fragments of bits, map each fragment of bits to a different orthogonal frequency division multiplexed, OFDM, symbol, encode the fragments using on-off keying or frequency shift keying, manipulate the encoded fragments to obtain a cyclic signal for each OFDM symbol and transmit a wakeup signal comprising the manipulated fragments.

Example embodiments of the first aspect may comprise at least one feature from the following bulleted list or any combination of the following features:

- wherein the stored instructions further cause, when executed by the at least one processing core, the apparatus at least to manipulate the encoded fragments by adding an extra bit to a beginning or an end of each fragment;
- wherein the extra bit is a copy of a bit in an opposite end of the fragment;
- wherein the extra bit is an inverse of a bit in an opposite end of the fragment;

- wherein the stored instructions further cause, when executed by the at least one processing core, the apparatus at least to manipulate the encoded fragments by mapping one of an ON or OFF transitions to be at a start or an end of a cyclic prefix field of each fragment;
- wherein the stored instructions further cause, when executed by the at least one processing core, the apparatus at least to manipulate the encoded fragments by positioning each fragment after a cyclic prefix such that each fragment occupies a corresponding OFDM symbol and fill a remaining part of each OFDM symbol;
- wherein the remaining parts are filled with information with shorter ON/OFF duration than the fragments;
- wherein the remaining parts are padded;
- wherein the stored instructions further cause, when executed by the at least one processing core, the apparatus at least to manipulate the encoded fragments by cyclic shifting each fragment with a time shift equal to a duration of a cyclic prefix field and acquiring the cyclic prefix field by copying a last part of each fragment after said cyclic shifting.

According to a second aspect of the present disclosure, there is provided an apparatus comprising at least one processing core and at least one memory storing instructions that, when executed by the at least one processing core, cause the apparatus at least to receive a wakeup signal comprising manipulated fragments, reconstruct said manipulated fragments, convert each fragment into bits and combine said bits to reconstruct a bit sequence.

Example embodiments of the first aspect may comprise at least one feature from the following bulleted list or any combination of the following features:

- wherein the stored instructions further cause, when executed by the at least one processing core, the apparatus at least to reconstruct said manipulated fragments by removing an extra bit from a beginning or an end of each fragment;
- wherein the stored instructions further cause, when executed by the at least one processing core, the apparatus at least to reconstruct said manipulated fragments by tolerating one of an ON or OFF transitions at a start or an end of a cyclic prefix field of each fragment;
- wherein the stored instructions further cause, when executed by the at least one processing core, the apparatus at least to reconstruct said manipulated fragments by acquiring symbol synchronization and separating each fragment from a cyclic prefix and a remaining part with information with shorter ON/OFF duration than the fragments;
- wherein the stored instructions further cause, when executed by the at least one processing core, the apparatus at least to reconstruct said manipulated fragments by acquiring symbol synchronization and separating each fragment from a cyclic prefix and a remaining part with padding;
- wherein the stored instructions further cause, when executed by the at least one processing core, the apparatus at least to reconstruct said manipulated fragments by acquiring symbol synchronization and removing a last of each OFDM symbol, wherein the last part is equal to a length of a cyclic prefix and cyclic shifting each fragment with a time shift equal to a duration of a cyclic prefix field and acquiring the cyclic prefix field by copying a last part of each fragment after said cyclic shifting.

According to a third aspect of the present disclosure, there is provided a method comprising determining a bit sequence, dividing the bit sequence into fragments of bits, mapping each fragment of bits to a different OFDM symbol, encoding the fragments using on-off keying or frequency shift keying, manipulating the encoded fragments to obtain a cyclic signal for each OFDM symbol and transmitting a wakeup signal comprising the manipulated fragments.

According to a fourth aspect of the present disclosure, there is provided a method comprising receiving a wakeup signal comprising manipulated fragments, reconstructing said manipulated fragments, converting each fragment into bits and combining said bits to reconstruct a bit sequence.

According to a fifth aspect of the present disclosure, there is provided an apparatus, comprising means for determining a bit sequence, means for dividing the bit sequence into fragments of bits, means for mapping each fragment of bits to a different OFDM symbol, means for encoding the fragments using on-off keying or frequency shift keying, means for manipulating the encoded fragments to obtain a cyclic signal for each OFDM symbol and means for transmitting a wakeup signal comprising the manipulated fragments.

According to a sixth aspect of the present disclosure, there is provided an apparatus, comprising means for receiving a wakeup signal comprising manipulated fragments, means for reconstructing said manipulated fragments, means for converting each fragment into bits and means for combining said bits to reconstruct a bit sequence.

According to a seventh aspect of the present disclosure, there is provided a non-transitory computer readable medium having stored thereon a set of computer readable instructions that, when executed by at least one processor, cause an apparatus to at least to perform the first or the second method. According to an eighth aspect of the present disclosure, there is provided a computer program comprising instructions which, when the program is executed by an apparatus, cause the apparatus to carry out the first or the second method.

EXAMPLE EMBODIMENTS

Embodiments of the present disclosure provide improvements for saving power in cellular communication networks. More specifically, embodiments of the present disclosure enable power savings by making it possible to adapt Manchester encoded On-Off Keyed, OOK, signals, like Wake-UP Signals, WUSs, such that the OOK signals may be transmitted with correct Cyclic Prefix, CP, behaviour.

Figure 1A:
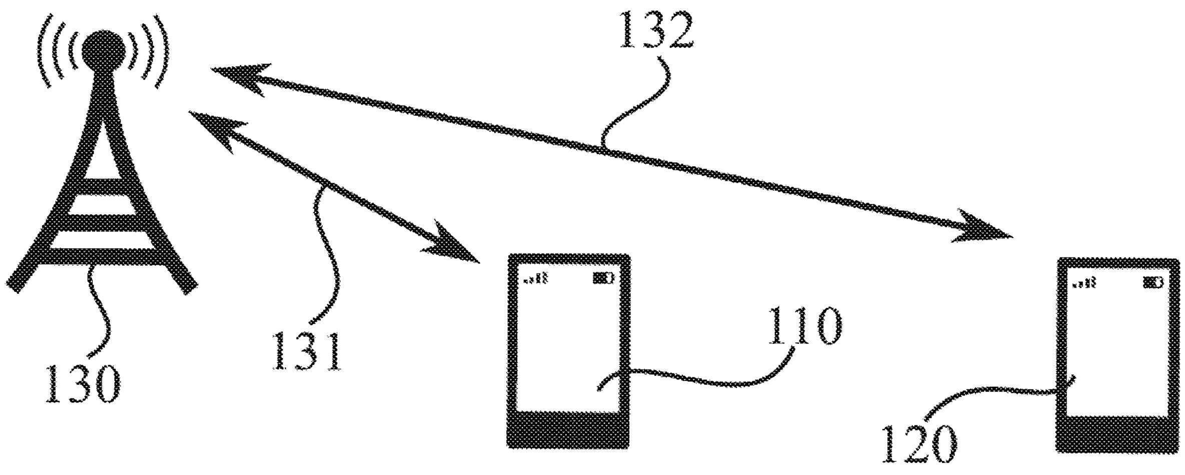
FIG. 1A illustrates an example system in accordance with at least some example embodiments.

FIG. 1A illustrates an example system in accordance with at least some embodiments of the present disclosure. Base node 130, such as a cellular base station 130, may be configured to operate based on a suitable technical standard, like a standard specified by a 3rd Generation Partnership Project, 3GPP, such as Long Term Evolution, LTE, fifth generation, 5G, or 6G, for example. A base station may be referred to as a radio node, network node, node, eNode B, eNB, gNB or any other suitable wireless network device. The base station may comprise a centralized unit, gNB-CU, and one or more distributed unit, gNB-DU. A gNB-CU and gNB-DU(s) may be connected using e.g. an F1 interface. Another term for 5G is new radio, NR. A yet further example of a suitable technical standard is 5G-Advanced. Alternatively, base node 130 may be a non-cellular base node, such as, for example, a Wireless Local Area Network, WLAN, or Worldwide interoperability for Microwave Access, WiMAX, access point.

In addition to base node 130, the system of FIG. 1 also comprises two User Equipments, UEs, 110 and 120. A UE may be referred to as a terminal, a terminal device, a user device or simply a device. UEs 110 and 120 may comprise a wireless transceiver configured to communicate using a cellular or non-cellular radio technology, such as one of those mentioned above, for example, to obtain interoperation with base node 130. UEs 110 and 120 may comprise, for example, an Internet of Things, IoT, node, such as a sensor node, or a utility meter which is not an IoT node, Machine-to-Machine, M2M, node, Machine-Type Communications, MTC, node or a Reduced Capability, RedCap, node.

UEs 110 and 120 are illustrated in FIG. 1A as including a display screen, however this is by no means compulsory as many UEs suitable for use with the presently disclosed mechanisms may be optimized for low power consumption and may well lack visual display screens. Rather, these UEs may be configured to provide, for example, an uplink transmission to base node 130 when requested, or according to a pre-configured time schedule for reporting. The uplink transmission may comprise sensor data generated by the respective UE 110, 120, or mesh-network data, for example, received in the UEs 110, 120 from further devices, which are not illustrated in FIG. 1A for the sake of clarity of the illustration.

UEs 110 and 120 may be configured operate according to at least one cellular or non-cellular radio standard. Furthermore, UEs 110 and 120 may be configured to spend time in an energy saving state when not transmitting or receiving via the wireless transceiver. The energy saving state may comprise that the wireless transceiver of UEs 110, 120 is in a low-power state. The low-power state of the wireless transceiver may be one where the wireless transceiver is switched off, or placed in a hibernated or otherwise inactive state where the wireless transceiver does not monitor for incoming transmissions and does not transmit signals. Further examples of names used of the hibernated or inactive state are Discontinuous Reception, DRX, sleep state, DRX-Off state, Radio Resource Control, RRC_Idle, and RRC Inactive states, etc.

The energy saving state may be extensive and extend also to other systems of UEs 110 and 120 than the wireless transceiver. UEs 110 and 120 may be powered by a non-rechargeable battery which aims to power UEs 110 and 120 for months, or even a year, wherefore optimization of power consumption needs to be conducted carefully. In particular, monitoring for transmissions using a cellular or non-cellular radio technology such as the ones mentioned above, for example, may consume so much power in UEs 110 and 120 of FIG. 1A that these radio technologies are not used in the energy saving state.

To enable communication with UEs 110 and 120 in the energy saving state, UEs 110, 120 may be equipped with a wireless receiver. The wireless receiver may be separate from the wireless transceiver which is usable with the cellular or non-cellular technology to receive modulated payload data from the wireless communication system. Base node 130 may provide a signal, such as a wake-up signal, that the wireless receiver is configured to detect. The wireless receiver may be referred to, for example, as a low-power receiver, an ultra-low power receiver or a Wake-Up Receiver, WUR. Responsive to the signal, the UE that received the signal may be configured to switch its wireless transceiver from the low-power state to an active state.

Examples of the active state comprise RRC_Active, DRX-On and DRX-Active. In the active state, the wireless transceiver may be able to receive and/or transmit information based on the cellular or non-cellular radio technology that the UE is configured to use. Initially in the active state, the UE may be in an RRC_Idle state, from which an RRC connection may be established whereby the state is switched to RRC_Connected. The wireless transceiver may be the main radio of the UE, while the wireless receiver may be used to receive the signal to end the energy saving state.

Figure 1B:
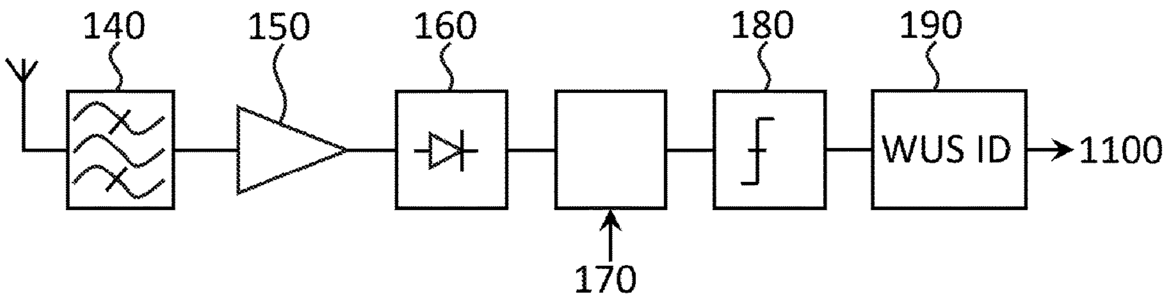
FIG. 1B illustrates an example wireless receiver in accordance with at least some example embodiments.

FIG. 1B illustrates an example wireless receiver in accordance with at least some embodiments of the present disclosure. In more detail, FIG. 1B illustrates an example wireless receiver suitable for receiving the wake-up signal from base node 130. The wireless receiver may be a wireless receiver of UE 110 for example.

A signal, such as a signal based on using OOK, like Multi-Carrier, MC-OOK, may be provided from a receive antenna to a band-pass filter 140, thence to a low-noise amplifier 150, thence to an envelope detector 160, thence to an integrator 170 which is configured to reset at a symbol time interval.

The integrator 170 may provide its output to a comparator 180, which in turn provides its output to a correlator 190 which detects whether a specific WUS, possibly identified with a WUS Identity, WUS ID, has been detected. If this is the case and UE 110 is configured to respond to this specific wake-up signal, then a signal 1100 may be provided to switch on the wireless transceiver of UE 110, which may be the main radio of UE 110, as noted above.

After the envelope detector 160, the signal may be a low frequency signal being either low when a 0 is received or high when a 1 is received. By integrating the signal over each symbol duration, the signal noise may be suppressed, and the comparator 180 may then determine if the received symbol is a 0 or 1 by comparing with the average signal level. Finally, in correlator 190 the detected bit sequence is correlated with the expected signal. In some example embodiments, the comparator 180 may also be a referred to as a 1 bit Analog-to-Digital Converter, ADC. The receiver may do oversampling on the received signal using a 1 bit ADC.

An advantage of the receiver illustrated in FIG. 1B is that it does not require a mixer, an analogue-to-digital converter or advanced baseband processing, making it inherently a very power-efficient solution. In practice such receivers may be more complex than the one illustrated, but FIG. 1B demonstrates that the receiver ideally may be very simple, which is why OOK and MC-OOK are attractive modulation schemes to select when designing the signal to be sent to the wireless receiver.

An OOK signal may be approximated by base node 130 by performing an M-point Discrete Fourier Transform, DFT, and using the output of the DFT as input for generation of an OFDM symbol to be transmitted. A number of OOK symbols inside an OFDM symbol may be quite restricted though, e.g., due to a potential delay spread of a wireless channel, which would result in Inter Symbol Interference, ISI, for short OOK symbols.

In some example embodiments of the present disclosure, it may be therefore desirable to let an OOK signal, like a WUS message, to span over multiple OFDM symbols and thereby cross the CP field between these symbols. If a length of an OOK symbol would be equal to a length of one OFDM symbol plus the CP, the CP field would not cause problems as it is just extending the OOK symbol. However, for example in 5G NR the OFDM symbol may comprise multiple OOK symbols to increase the OOK symbol rate and thus, the complete OOK signal may span over multiple OFDM symbols, so the impact of CP field needs to be handled. It is therefore desirable to provide enhancements for low-power wireless devices that use OOK signals, like WUSs, for saving power.

Figure 2:
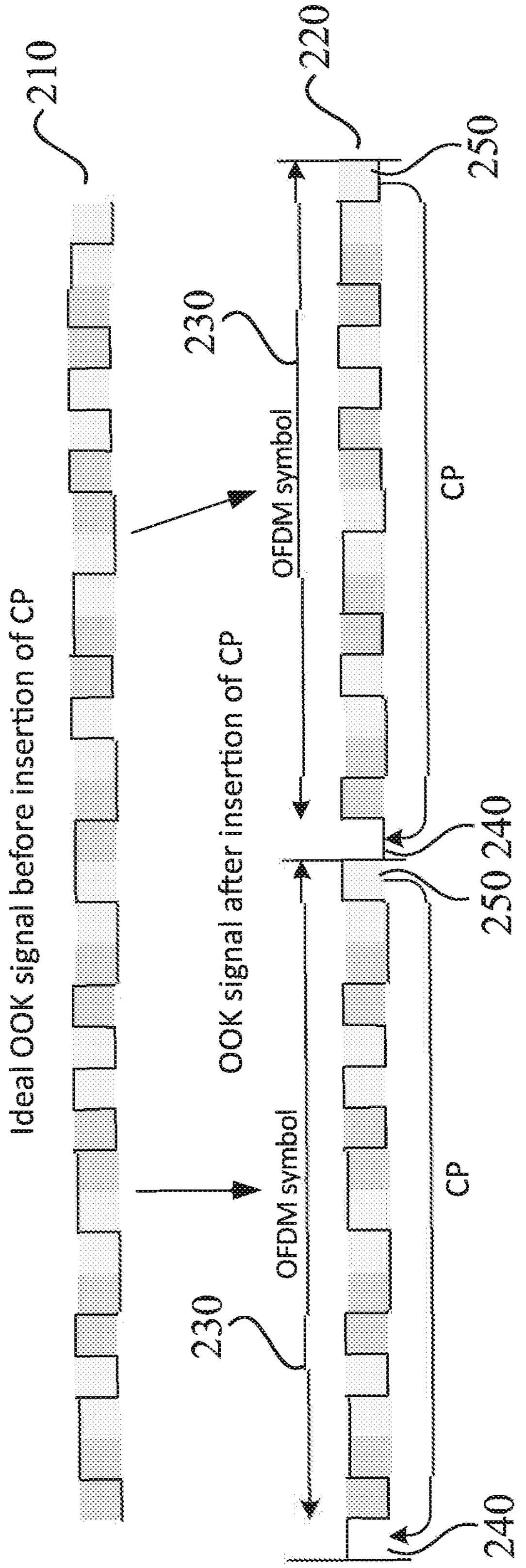
FIG. 2 illustrates an example of an ideal OOK signal before insertion of a CP and how the signal may impacted by the CP in accordance with at least some example embodiments.

FIG. 2 illustrates an example of an ideal OOK signal before insertion of CP and how the signal may impacted by the CP. An ideal OOK signal is denoted by 210 and an OOK signal after insertion of CPs is denoted by 220. Moreover, OFDM symbols are denoted by 230, CPs are denoted by 240 and last symbol of OFDM symbol 230 is denoted by 250. In some example embodiments, OFDM symbol 230 may also be referred to as an Fast Fourier Transform, FFT, window and the FFT window and the prepended CP 240 may be referred to as an OFDM symbol. As illustrated in FIG. 2, insertion of CPs 240 needs to be enhanced, because otherwise a receiver of the OOK signal comprising OFDM symbols 230 and CPs 240 would not be able to detect the transmitted OOK symbols correctly.

In some example embodiments of the present invention, adaptation of an ideal Manchester encoded OOK signal, like a WUS, is therefore enabled such that the OOK signal may be transmitted with correct CP behavior across multiple OFDM symbols. An OOK signal with "Correct CP behavior" may be defined for example as an OOK signal which, when mapped onto the OFDM symbols, has CP fields which are a copy of the end of the respective OFDM symbols, i.e., last symbol 250. The signal adaption may be done in several different ways, e.g., depending on a length of the OOK symbol relative to a length of CP 240.

For instance, in case of short OOK symbol durations, a last Manchester encoded OOK symbol 250 may be selected as CP 240 such that it ensures correct CP behavior. When decoding the received OOK symbols, UE 110 may discard CP 240 or CP 240 may be exploited such that it is correlated with the first OOK symbol, e.g., to improve robustness). Alternatively, in case of long OOK symbol durations, the OOK symbol duration may be extended in one OFDM symbol and reduced in the subsequent OFDM symbol, to ensure correct CP behavior.

Figure 3:
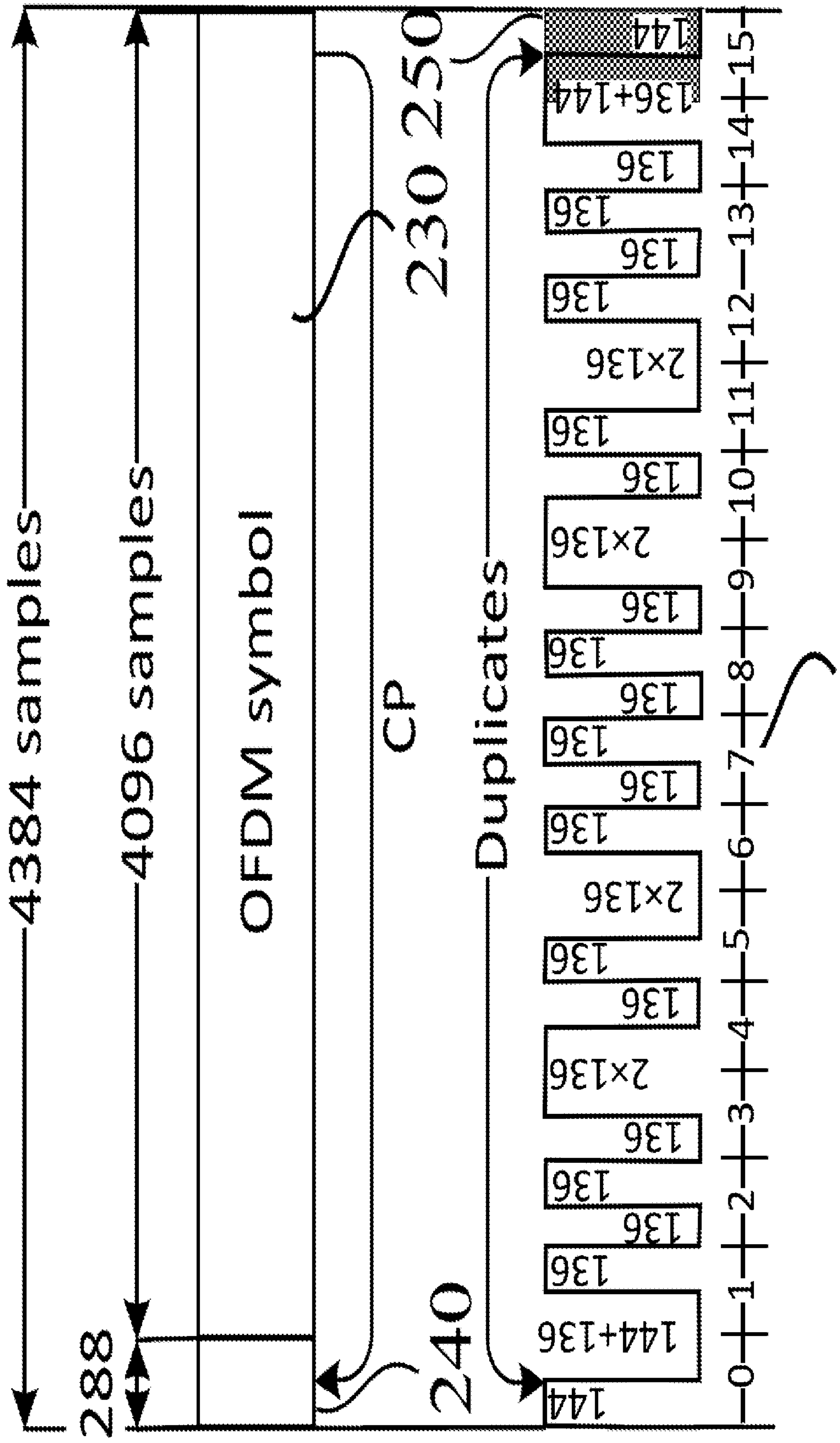
FIG. 3 illustrates an example of use case A with 16 Manchester encoded MC-OOK symbols per OFDM symbol in accordance with at least some example embodiments.

FIG. 3 illustrates an example of use case A with 16 Manchester encoded MC-OOK symbols per OFDM symbol in accordance with at least some example embodiments. OFDM symbol 230, CP 240 and last symbol 250 of FIG. 2 are illustrated in FIG. 2. In addition, at least one other symbol of OFDM symbol 230 is denoted by 310.

In the example of FIG. 3, last symbol 250, i.e., OOK symbol 15, may have a value wanted at CP 240, i.e., OOK symbol 0, in order to ensure CP behaviour. For example, base node 130 may set the value wanted at OOK symbol 0 as a value of OOK symbol 15, That is, base node 130 may generate an OOK signal by generating OFDM symbol 230 and inserting CP 240, wherein a length of last on-off keyed symbol 250 of OFDM symbol 230 is the same as a length of CP 240. Hence, a length of the last symbol 250 in an FFT window, i.e., in OFDM symbol 230 may be equal to a length of CP 240. In the example of FIG. 3, a length of the FFT window is 4384 samples, comprising OFDM symbol 230 of length 4096 samples and CP 240 of length 288 samples.

Base station 130 may further transmit the generated OOK signal to UE 110 and UE 110 may receive it accordingly. In some example embodiments, when decoding the OOK signal, like a WUS message, UE 110 may discard symbol 15, i.e., last symbol 250.

As illustrated in FIG. 3, a length of at least one other on-off keyed symbol 310 of OFDM symbol 230 may be different than the length of CP 240 (and the length of last symbol 250). At least one other on-off keyed symbol 310 may be in the middle of OFDM symbol 230, i.e., in between CP 240 and last symbol 250. Last symbol 250 of OFDM symbol 230 may have a same value as CP 240. In this case, the inserted symbol may have the same length as CP 240.

Base node 130 may thus manipulate the encoded fragments by adding an extra bit to a beginning or an end of each fragment, wherein the extra bit is a copy of a bit in an opposite end of the fragment. UE 110 may then reconstruct said manipulated fragments by removing the extra bit from the beginning or the end of each fragment.

Figure 4:
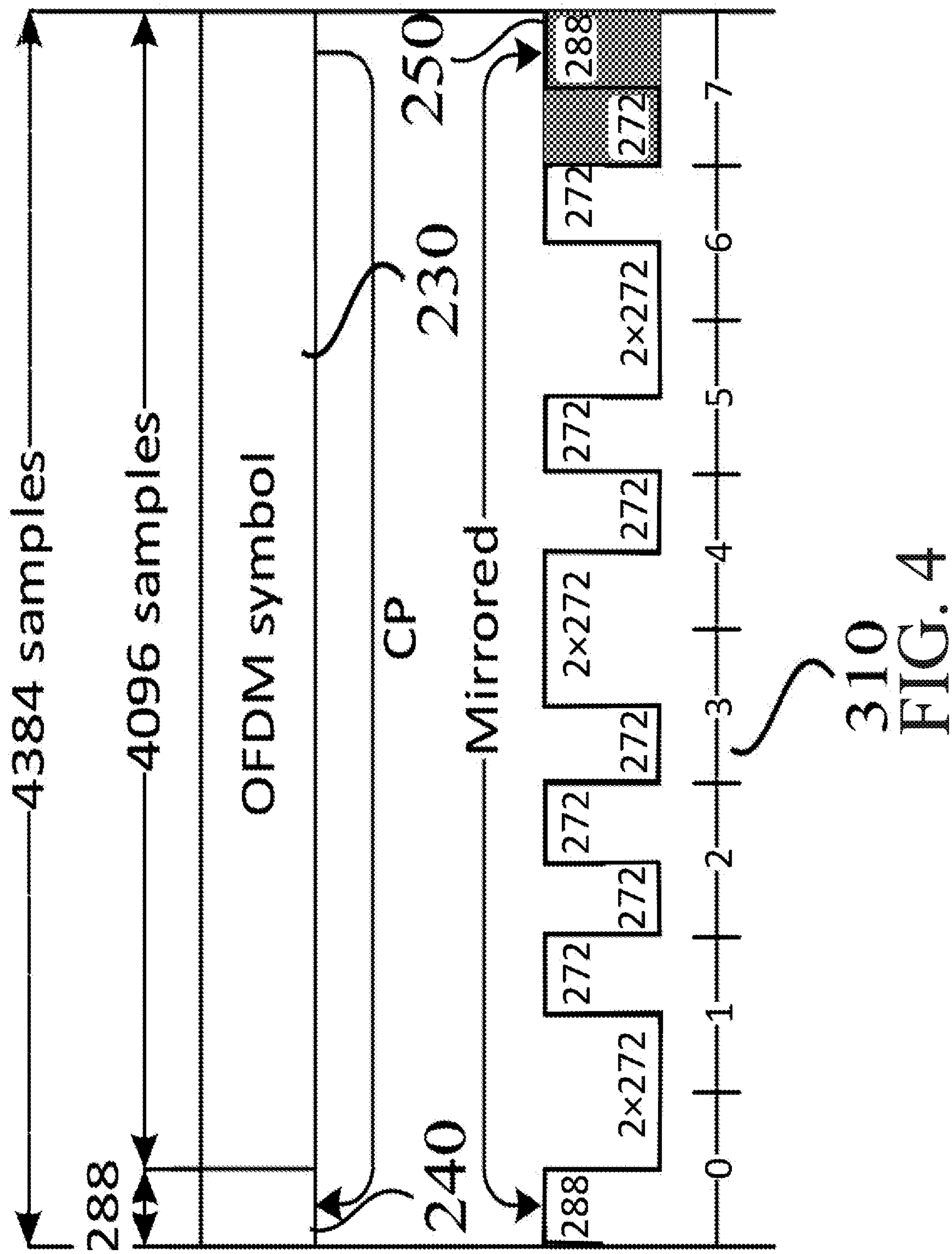
FIG. 4 illustrates an example of use case B with 8 Manchester encoded MC-OOK symbols per OFDM symbol in accordance with at least some example embodiments.

FIG. 4 illustrates an example of use case B with 8 Manchester encoded MC-OOK symbols per OFDM symbol in accordance with at least some example embodiments. OFDM symbol 230, CP 240, last symbol 250 and at least one other symbol 310 of FIG. 3 are illustrated in FIG. 4. However, in the example of FIG. 4, last symbol 250 of OFDM symbol 230 may be a mirror image compared of CP 240. That is, base node 130 may mirror last symbol 250 to generate CP 240.

In the example of FIG. 4, the mirroring, i.e., inversion, may be either a sample-wise inversion or an ON/OFF duration-wise inversion. Both may be used to have the same end result. As illustrated in FIG. 4, CP 240 comprises 288+272 samples and last symbol comprises 272+288 so the two symbols are mirrored, while having an equal length which is different compared to a length of at least one other symbol 310 in the middle of OFDM symbol 230.

Hence, there is a difference in how last symbol 250 may be decided in use case A illustrated in FIG. 3 and use case B illustrated in FIG. 4. In use case A, last symbol 250 may be set to the value wanted at symbol 0, i.e., CP 240, whereas in use case B, last symbol 250 may be mirrored compared to the symbol wanted at OOK symbol 0. The difference may be caused by the difference in OOK symbol length in the two cases. The mirroring approach may be used for example when the ON/OFF durations are equal to, or longer than, the CP duration.

In some example embodiments, a length of an OOK symbol may not be much shorter than a length of CP 240, to avoid degradation of the OOK symbols due to ISI in case of large delay spreads in the wireless channel. However, if a length of an OOK symbol would be much shorter than the length of CP 240, it would be necessary to reserve multiple OOK symbols for CP adaptation instead of just one.

For instance, in use cases A and B illustrated in FIGS. 3 and 4, respectively, the OOK symbol reserved for CP adaption, i.e., symbol 0, may be approximately twice the duration of CP 240, at most. In case the OOK symbol is much longer, the overhead of reserving an OOK symbol for the CP adaptation becomes quite high and in this case an alternative adaptation of the OOK signal may be better. That is, in use cases A and B a length of the symbol reserved for cyclic prefix adaptation may be at most twice a duration of CP 240.

For instance, the ideal OOK signal may be offset in time relative to the OFDM symbols such that the CP field 240 of the OFDM symbols may be aligned with a transition point of one of the Manchester encoded OOK symbols. That is, the on-off keyed signal may comprise at least two parts, wherein each of the at least two parts comprises OFDM symbol 230 and CP 240. There may also be a transition point between consecutive parts of the at least two parts of the OOK signal. In order to ensure correct CP behavior, the transition point aligned with the CP field may be shifted to just after to the CP field.

Base node 130 may thus manipulate the encoded fragments by adding an extra bit to a beginning or an end of each fragment, wherein the extra bit is an inverse of a bit in an opposite end of the fragment. UE 110 may then reconstruct said manipulated fragments by removing the extra bit from the beginning or the end of each fragment.

Figure 5:
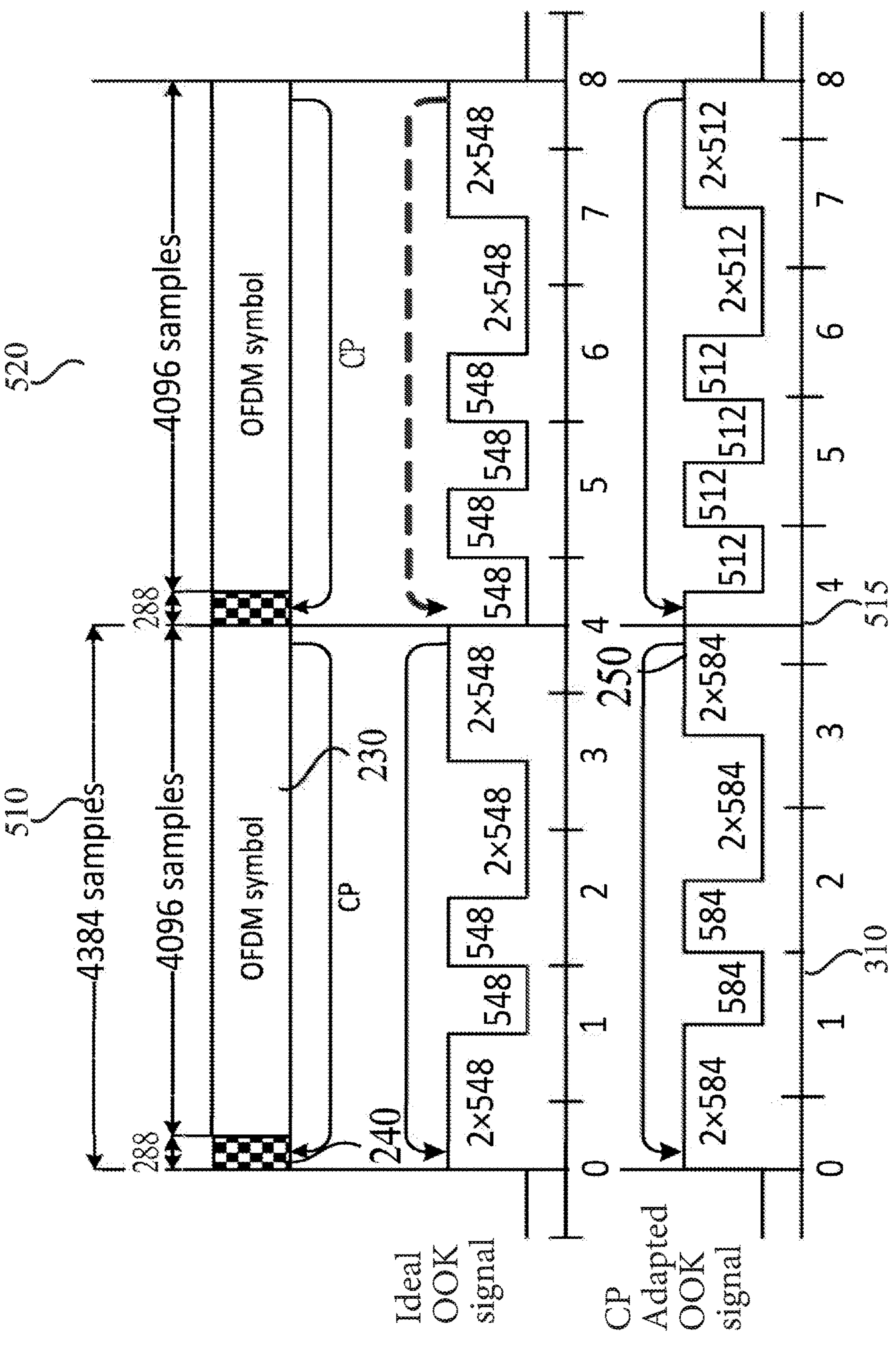
FIG. 5 illustrates an example of use case C1 with 4 Manchester encoded MC-OOK symbols per OFDM symbol in accordance with at least some example embodiments.

FIG. 5 illustrates an example of use case C1 with 4 Manchester encoded MC-OOK symbols per OFDM symbol in accordance with at least some example embodiments. The exact length of the MC-OOK symbols may be adapted per OFDM symbol. OFDM symbol 230, CP 240, last symbol 250 and at least one other symbol 310 of FIG. 3 are illustrated in FIG. 5. In addition, FIG. 5 illustrates two parts 510 and 520 of the OOK signal, like a WUS, and transition point between said two parts 510 and 520 is denoted by 515.

As illustrated in FIG. 5, the OOK signal may comprise at least two parts 510 and 520, and a length of OOK symbols of first part 510 may be different compared to a length of OOK symbols of second part 520. First part 510 may be referred to as a first FFT part and second part 520 may be referred to as a second FFT, wherein each of the FFT parts comprises one OFDM symbol 230 and one CP 240. As illustrated in FIG. 5, a length of OOK symbols in a first OFDM symbol may be different compared to a length of OOK symbols in a second OFDM symbol.

The dashed arrow in FIG. 5 shows that the ideal OOK signal would not have correct CP behavior and the CP adapted signal shows how the transition point is delayed to after the CP field by slightly increasing the OOK symbol duration in the previous OFDM symbol and slightly decreasing the OOK symbol duration in the actual OFDM symbol. Hence, CP field 240 of the OOK signal may be aligned with transition point 510 of one OOK symbol of the OOK signal.

Base node 130 may thus manipulate the encoded fragments by mapping one of an ON or OFF transitions to be at a start or an end of a cyclic prefix field of each fragment. UE 110 may then reconstruct said manipulated fragments by tolerating one of the ON or OFF transitions at the start or the end of the cyclic prefix field of each fragment.

Figure 6:
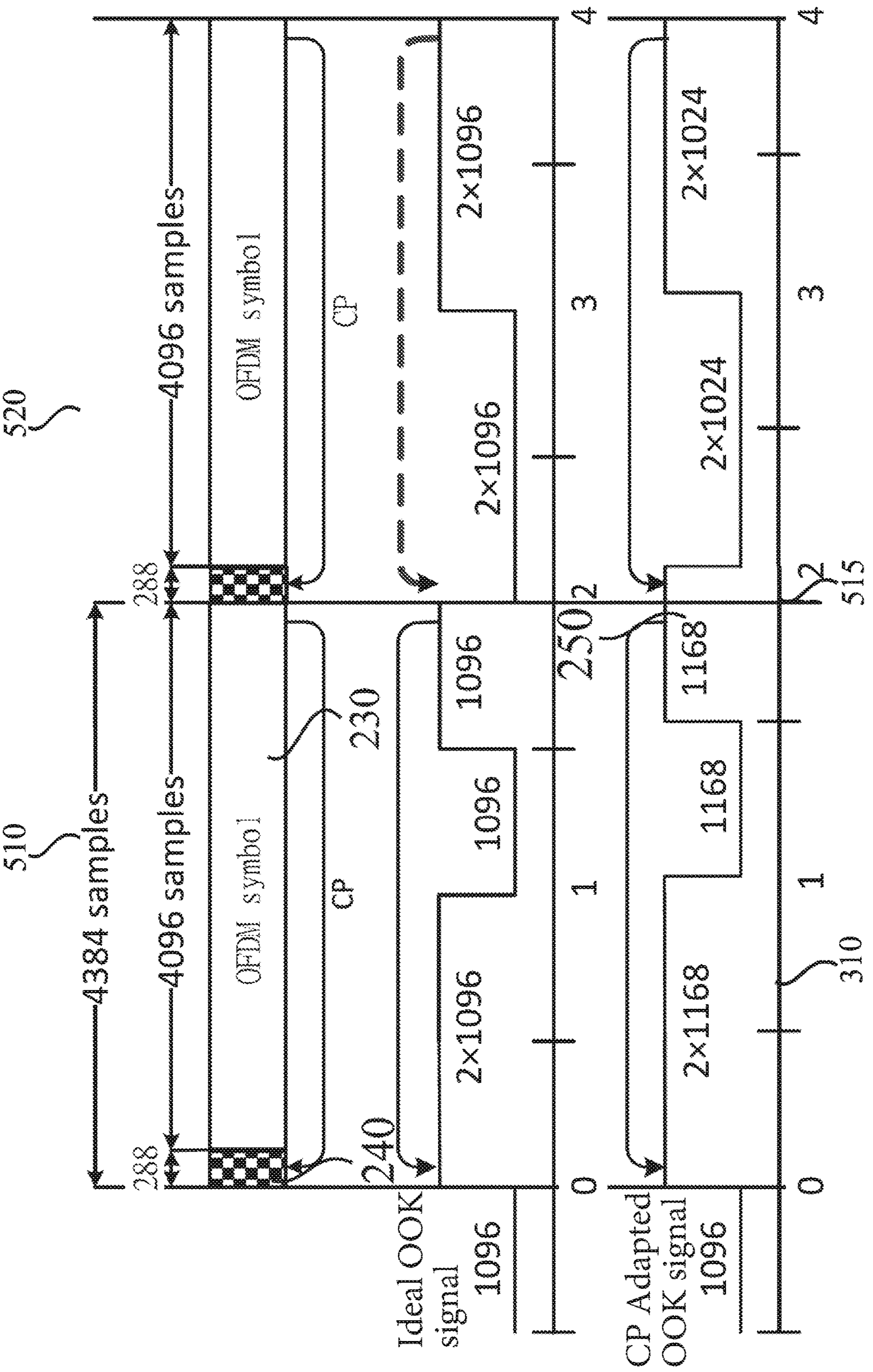
FIG. 6 illustrates an example of use case C2 with 2 Manchester encoded MC-OOK symbols per OFDM symbol in accordance with at least some example embodiments.

FIG. 6 illustrates an example of use case C2 with 2 Manchester encoded MC-OOK symbols per OFDM symbol in accordance with at least some example embodiments. The exact length of the MC-OOK symbols may be adapted per OFDM symbol. OFDM symbol 230, CP 240, last symbol 250 and at least one other symbol 310 of FIG. 3 are illustrated in FIG. 6. In addition, first part 510 and second part 520 are shown along with transition point 515 of FIG. 5.

Also in the example of FIG. 6, the OOK signal may comprise at least two parts 510 and 520, and a length of OOK symbols of first part 510 may be different compared to a length of OOK symbols of second part 520 and CP field 240 of the OOK signal may be aligned with transition point 510 of one OOK symbol of the OOK signal. In the examples of FIG. 5 and FIG. 6, a length of a symbol reserved for cyclic prefix adaptation may be more than twice a duration of CP 240.

Common for the examples illustrated in FIG. 3 to FIG. 6 may be at least that UE 110 may need to be able to cope with the variable OOK symbol duration. It may be particularly significant in the examples illustrated FIG. 5 and FIG. 6 (use case C1 and C2, respectively). In these two cases, it may mean that UE 110 needs to tolerate variance in the OOK symbol duration, e.g., of +/−6.6% equal to the relative length of the normal CP field compared to the length of an OFDM symbol. If the OOK signal, like a WUS signal, is transmitted in the symbols with long CP 240, the variance may be up to +/−7.8% for 15 kHz Subcarrier Spacing, SCS.

Base node 130 may thus manipulate the encoded fragments by mapping one of an ON or OFF transitions to be at a start or an end of a cyclic prefix field of each fragment. UE 110 may then reconstruct said manipulated fragments by tolerating one of the ON or OFF transitions at the start or the end of the cyclic prefix field of each fragment.

Figure 7:
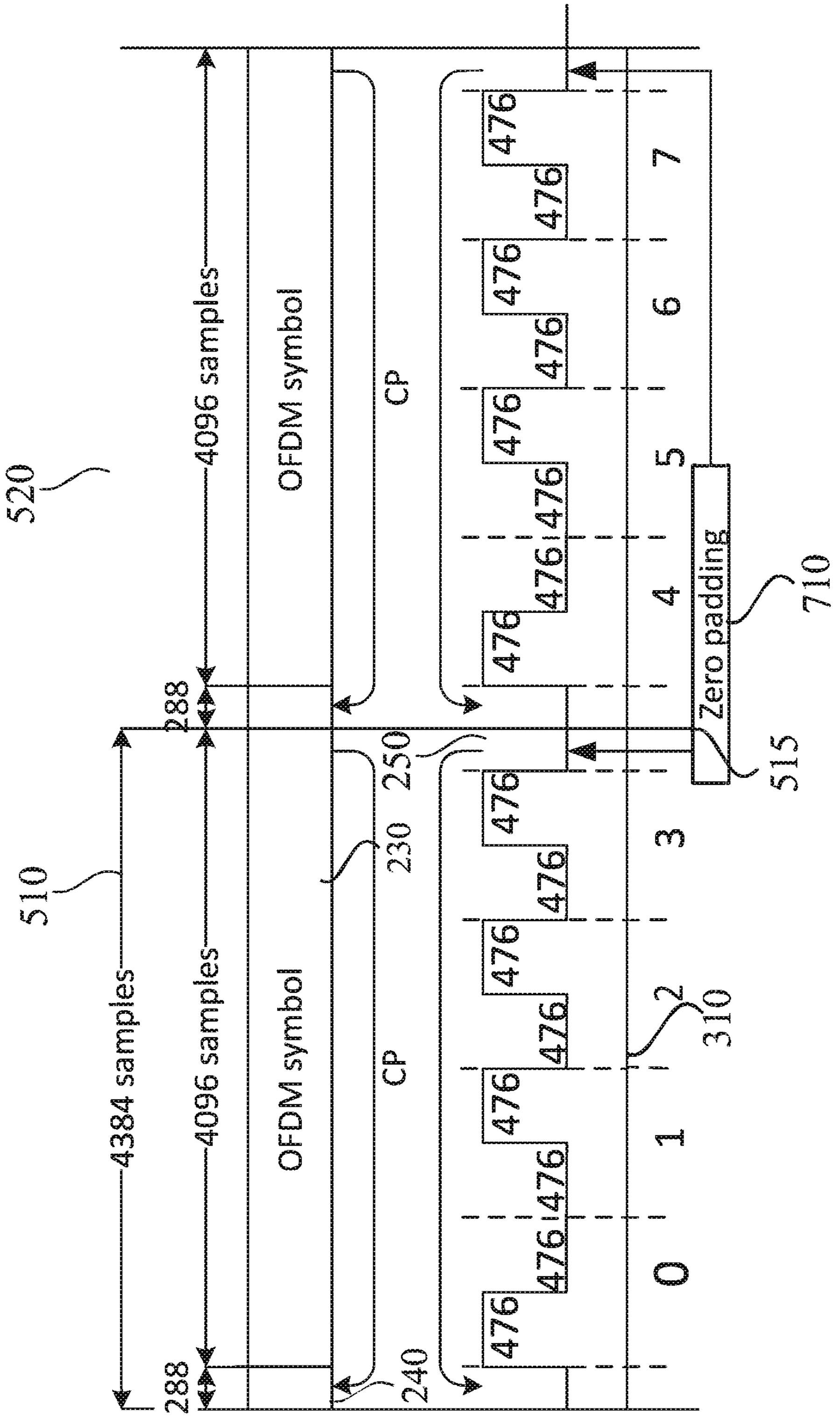
FIG. 7 illustrates an example of zero padding in accordance with at least some example embodiments.

FIG. 7 illustrates an example of zero padding in accordance with at least some example embodiments. In addition to elements illustrated in FIG. 5 and FIG. 6, zero padding 710 is shown in FIG. 7. As illustrated in FIG. 7, CP 240 and last symbol 250 may be padded.

Zero padding may be for example added in input symbols of DFT-spread-OFDM, DFT-s-OFDM, before DFT operation. Zero padding may be copied into the CP insertion performed at the CP-OFDM stage prior to transmission. Reception at Low-power Radio, LR, may be band-limited to receive only Low-Power, LP-WUS transmission, the effect of CP from other subcarriers outside the LP-WUS BW may be removed, thereby the actual DFT-s-OFDM symbol may be embedded between two guard periods with zero transmission, i.e., in between CP 240 and last symbol 250. In some example embodiments, the padding may also be done with other levels than zero. For instance, zero padding may be used with zero-tail DFT-s-OFDM, as these may be low power samples.

Base node 130 may thus manipulate the encoded fragments by positioning each fragment after a cyclic prefix such that each fragment occupies a corresponding OFDM symbol and fill a remaining part of each OFDM symbol, wherein the remaining parts are padded. UE 110 may then reconstruct reconstruct said manipulated fragments by acquiring symbol synchronization and separating each fragment from the cyclic prefix and the remaining part with padding.

Figure 8:
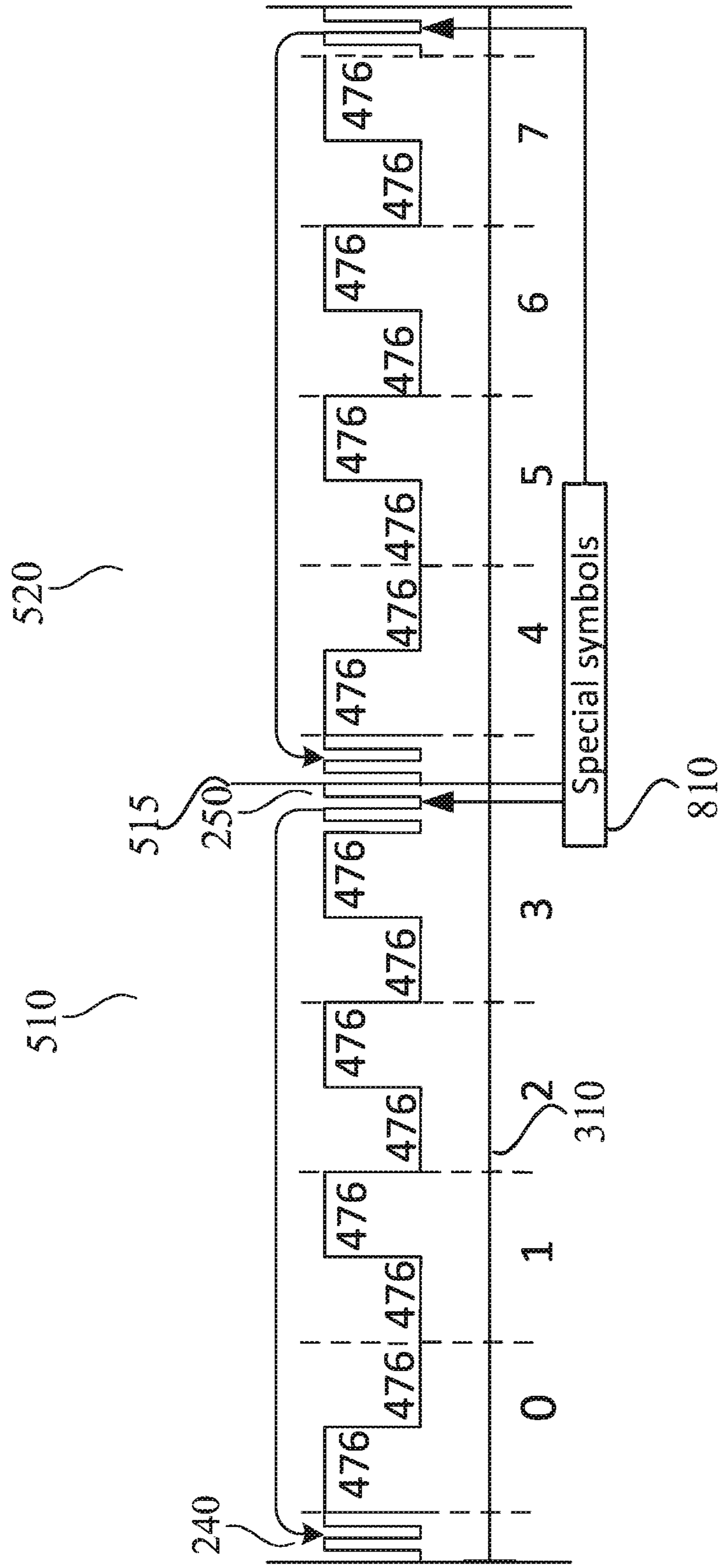
FIG. 8 illustrates an example of special symbols in accordance with at least some example embodiments.

FIG. 8 illustrates an example of special symbols in accordance with at least some example embodiments. In addition to elements illustrated in FIG. 5 and FIG. 6, special symbols 810 are shown in FIG. 8. Special symbols 810 may comprise tail-bits. That is, CP 240 and last symbol 250 may comprise the tail-bits.

For instance, DFT-s-OFDM may be terminated with tail-bits comprising some synchronization sequence or system information, which may eventually be used by UE 110 for determining the symbol boundary and/or other information such as beam indication. The number of bits used for additional system information may be scalable with the SCS numerology as it may determine the number of samples used as CP 240, i.e. even though the CP duration becomes shorter when the SCS is increased, it may still have the same number of samples so the number of special OOK symbols may remain unchanged. The system information mentioned herein might not refer to System Information, SI, messages used for broadcasting.

In some example embodiments, the known tail may comprise the same sequence as the WUS beacon/sync field (or part of the same sequence). The length of system information bits may, or might not, be utilized by all UEs in the system due to ISI. It may also carry some sequence, which can be used to increase the robustness of finding the symbol boundary by a correlator type LR, which may be in cell-edge. Since these special symbols may be duplicated, it is possible to check for consistency and thereby potentially detect bit errors.

In some example embodiments, there may be two normal durations, so a longer CP duration may be applied every 0.5 ms to achieve integer number of symbols in 0.5 ms. For the longer CP duration, the padding (by zeroes on special symbols) duration may be extended. It may also be chosen to always do the padding with a length equal to the long CP which may also work for the OFDM symbols with normal CP.

For the special symbol case, different set of symbols may be applied for the longer CP symbols. If this sequence is different for the longer CP, then the LR may use this to also acquire subframe alignment. There may be one long CP at the beginning of the subframe and one in the middle of a subframe. The length of the system information bits may be assumed to be shorter than the normal OOK symbols and in such case they may have a worse Signal-to-Noise, SNR, performance, which may be exploited to do an early detection of potential loss of the OOK signal, like a WUS signal.

In some example embodiments, cyclic shift may be used, e.g., by assuming that UE 110 may maintain sync based on a first part of an OFDM symbol (i.e. the first part of an OFDM symbol will have transitions during every OOK symbol duration). There may be an integer number of OOK symbols in the FFT window. Each OOK symbol may have (substantially) the same length (e.g. 1, ½, ¼, ⅛, 1/16 of the FFT window length). ON/OFF durations may have substantially the same length.

For instance, a left cyclic shift may be applied to the OOK signal in the FFT window by the number of samples equal to the CP length in samples (e.g. 288 or 1420). The CP may then be inserted in the same way as in case of CP-OFDM. With the DFT-s-OFDM WUS generation, this may mean applying a left cyclic shift to the pre-DFT vector by n elements, where n=(CP length/FFT window length)*number of vector elements (e.g. n=9 for a 128 element pre-DFT vector to get CP of 288 samples and n=10 to get the CP of 1420 samples) and insert CP 240 in the same way as DFT-s-OFDM.

Base node 130 may thus manipulate the encoded fragments by positioning each fragment after a cyclic prefix such that each fragment occupies a corresponding OFDM symbol and fill a remaining part of each OFDM symbol, wherein the remaining parts are filled with information with shorter ON/OFF duration than the fragments. UE 110 may then reconstruct said manipulated fragments by acquiring symbol synchronization and separating each fragment from the cyclic prefix and the remaining part with information with shorter ON/OFF duration than the fragments.

Figure 9:
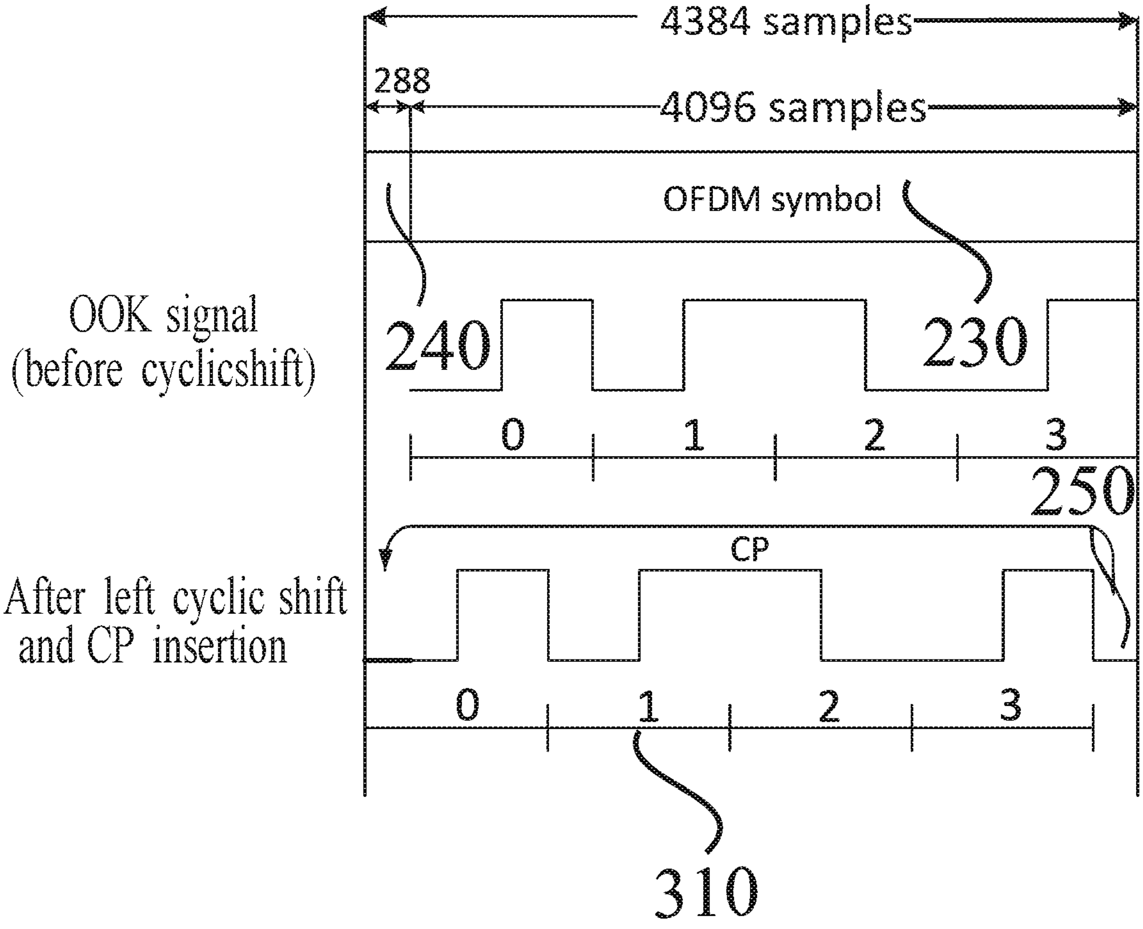
FIG. 9 illustrates an example of cyclic shift in accordance with at least some example embodiments.

FIG. 9 illustrates an example of cyclic shift in accordance with at least some example embodiments. For instance, there may be 4 OOK symbols per FFT window. Left cyclic shift may be performed with samples equal to the CP duration (e.g. 288 or 1420 samples), to ensure regular OOK behaviour in the start of the OFDM symbol. The irregularities may occur at the end of the OFDM symbol.

One benefit of having the OOK irregularities at the end, i.e., last symbol 250, of OFDM symbol 230 is that it allows, e.g., to transmit a sync word followed by this left cyclic shifted OFDM symbol without any irregularities before at the very end (UE 110 may ignore/discard this). The sync word may need to be designed to have correct CP behavior without any shift. By adopting this approach, base node 130 may for example send a beacon consisting of a sync word followed by a cell ID without any OOK irregularities inside the payload assuming that the payload can fit inside one OFDM symbol.

In some example embodiments, base node 130 may select one of the presented methods for the WUS signal generation (input to the DFT-s-OFDM before DFT operation). The selected method may be either explicitly known by UE 110 or informed to UE 110, e.g. as part of one System Information Block, SIB. If base node 130 has inserted an OOK symbol at the end of the OFDM symbol (use cases A and B), then UE 110 may need to detect and remove this/these symbol(s) before processing the WUS message. However, if base node has adapted the OOK symbol duration (use cases C1 and C2), then UE 110 may need to handle the jitter in the symbol duration, but in this case it might not remove any symbols. For use cases C1 and C2, UE 110 may also need to support the time offset of the OOK symbol alignment, i.e., OOK transition taking place at the beginning of the OFDM symbol.

In case of other options, UE 110 may be able to remove the padding or interpret the padding if it contains special symbols, e.g. system information or Cyclic Redundancy Check, CRC, bits. For the cyclic shift embodiment, UE 110 may be able to discard the OOK irregularities occurring at the end of the OFDM symbol.

Base node 130 may thus manipulate the encoded fragments by cyclic shifting each fragment with a time shift equal to a duration of a cyclic prefix field and acquiring the cyclic prefix field by copying a last part of each fragment after said cyclic shifting. UE 110 may then reconstruct said manipulated fragments by acquiring symbol synchronization and removing a last of each OFDM symbol, wherein the last part is equal to a length of a cyclic prefix and cyclic shifting each fragment with a time shift equal to a duration of a cyclic prefix field and acquiring the cyclic prefix field by copying a last part of each fragment after said cyclic shifting.

Figure 10:
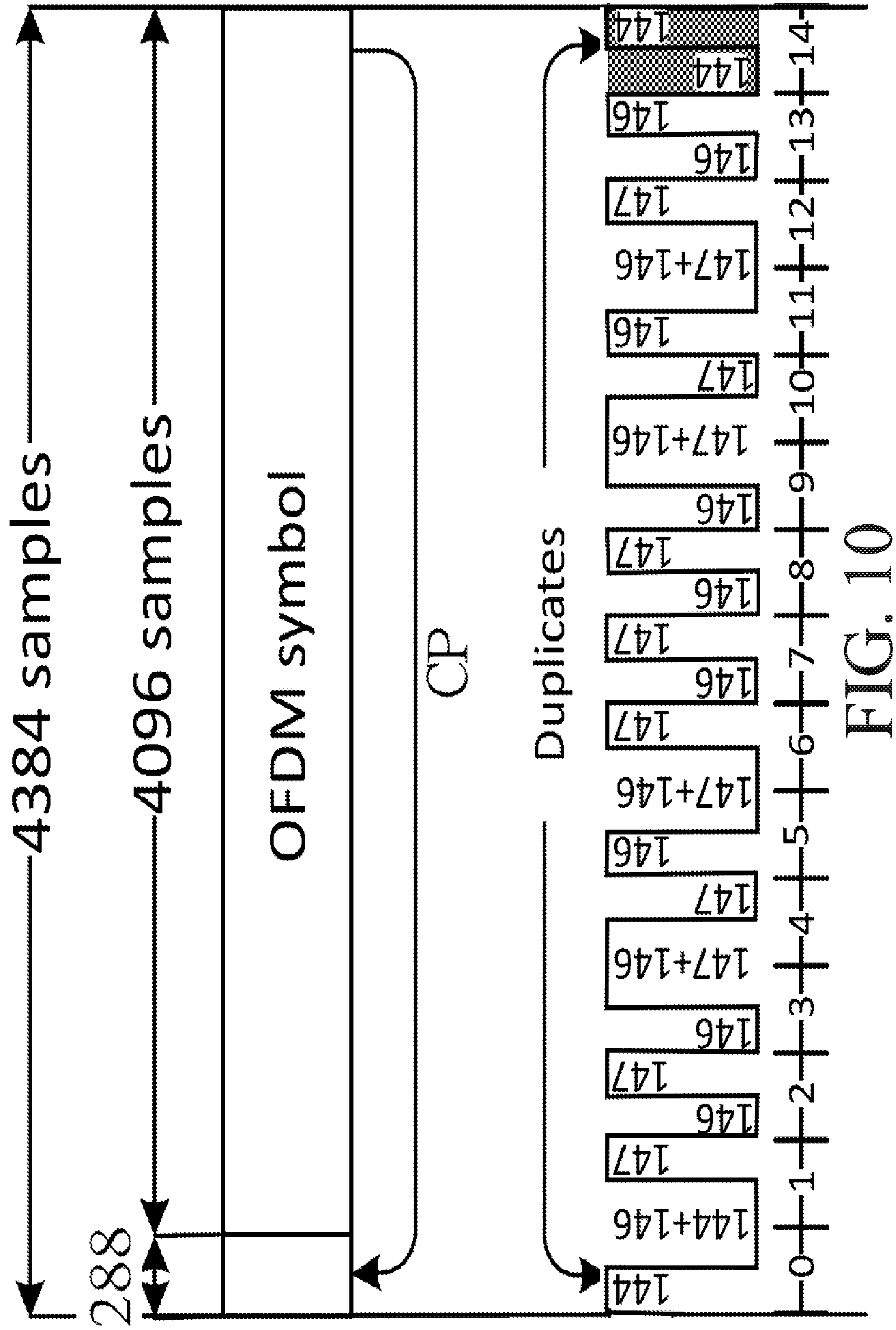
FIG. 10 illustrates an example, wherein 15 OOK symbols per OFDM symbol may give less variation in OOK symbol duration compared to 16 OOK symbols in accordance with at least some example embodiments.

FIG. 10 illustrates an example, wherein 15 OOK symbols per OFDM symbol may give less variation in OOK symbol duration compared to 16 OOK symbols in accordance with at least some example embodiments. The example illustrated in FIG. 10 may be related to use case A illustrated in FIG. 3 and comprise the same elements.

The symbol length of the CP adapted OOK symbol may be chosen to be equal to the length of the CP field, which for normal CP may be 288 samples at 15 kHz SCS (assuming a sample rate equal to 4096 samples per OFDM symbol). This means that the Manchester encoded OOK symbols 0 and 15 may be 288 samples and the rest of the 4096-288 samples may be distributed evenly on symbol 1 to 14 gives 272 samples for those symbols. An alternative may be to have one less OOK symbol (15 OOK symbols per OFDM symbol) as illustrated in FIG. 10, which would result in lower variance per OOK symbol but at the cost of a lower throughput. To fit the number of samples, there may need to be 1 OOK symbol of 288 samples (equal to the CP length), 12 OOK symbols of 293 samples, 1 OOK symbol of 292 samples and last OOK symbol with same length as the CP, i.e., 288 samples.

The OOK symbol length of OOK symbol 1 to 13 may be a little larger than the normal CP (288 samples) but a little smaller than the long CP (1420 samples for 15 kHz SCS). The average OOK symbol length may be 292.9 samples for OFDM symbols with normal CP and 290.4 samples for OFDM symbols with long CP. So, the OOK symbol duration may have low variance, except for OOK symbols 0 and 14 in OFDM symbols with long CP. These OOK symbols are approximately 10% longer than the symbols in between.

To fit the number of samples in case of 15 kHz SCS and long CP, the OOK symbol durations may need to be; 1 OOK symbol of 1420 samples equal to the CP length, 7 OOK symbols of 290 samples, 6 OOK symbols of 291 samples and last OOK symbol with same length as the CP, i.e. 1420 samples.

Figure 11:
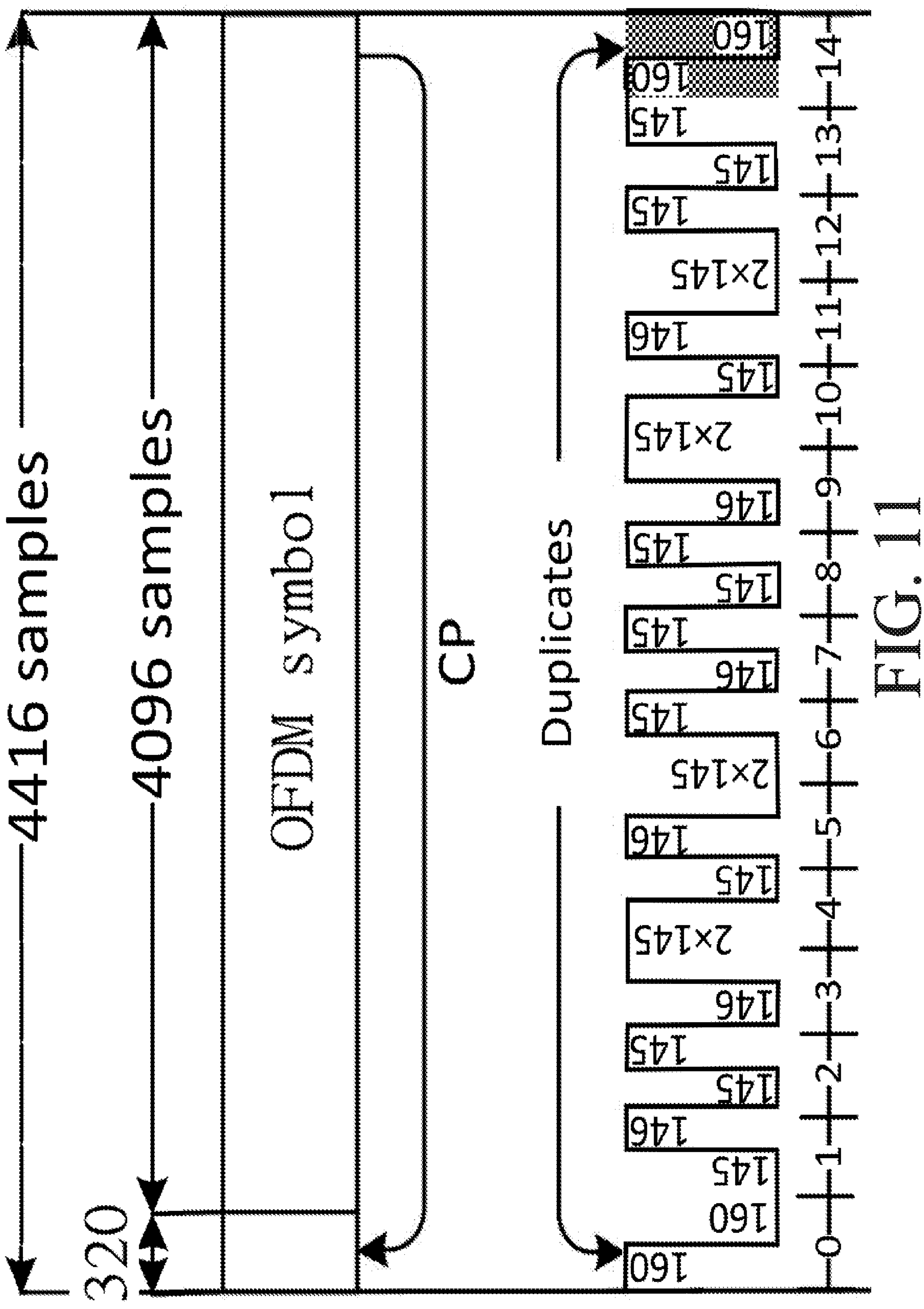
FIG. 11 illustrates an example, wherein 15 OOK symbols per OFDM symbol with a long CP may result in ~10% variance in the OOK symbol duration in accordance with at least some example embodiments.

FIG. 11 illustrates an example, wherein 15 OOK symbols per OFDM symbol with long CP may result in ~10% variance in the OOK symbol duration in accordance with at least some example embodiments. The example illustrated in FIG. 11 may be related to use case A illustrated in FIG. 3 and comprise the same elements.

Removal of the CP adapted OOK symbol may be performed as follows. Since these symbols occurs periodically at a predictable interval, it is possible to remove the symbols concatenating the remaining symbol to the complete WUS packet. Since this is an additional overhead, there may be situations where the symbol puncturing is unwanted. As an example, a potential WUS preamble/sync field may be constructed in such a way that the CP adapted OOK symbol is a part of the preamble/sync field. This would for instance be a benefit if the WUR is correlating with a sync word to find the beginning of the WUS packet. Another option may be to place CRC bits at these duplicated symbols (thereby interleaving the CRC bits with payload bits), since it would then increase the confidence in the CRC field since the bits are duplicated.

Figure 12:
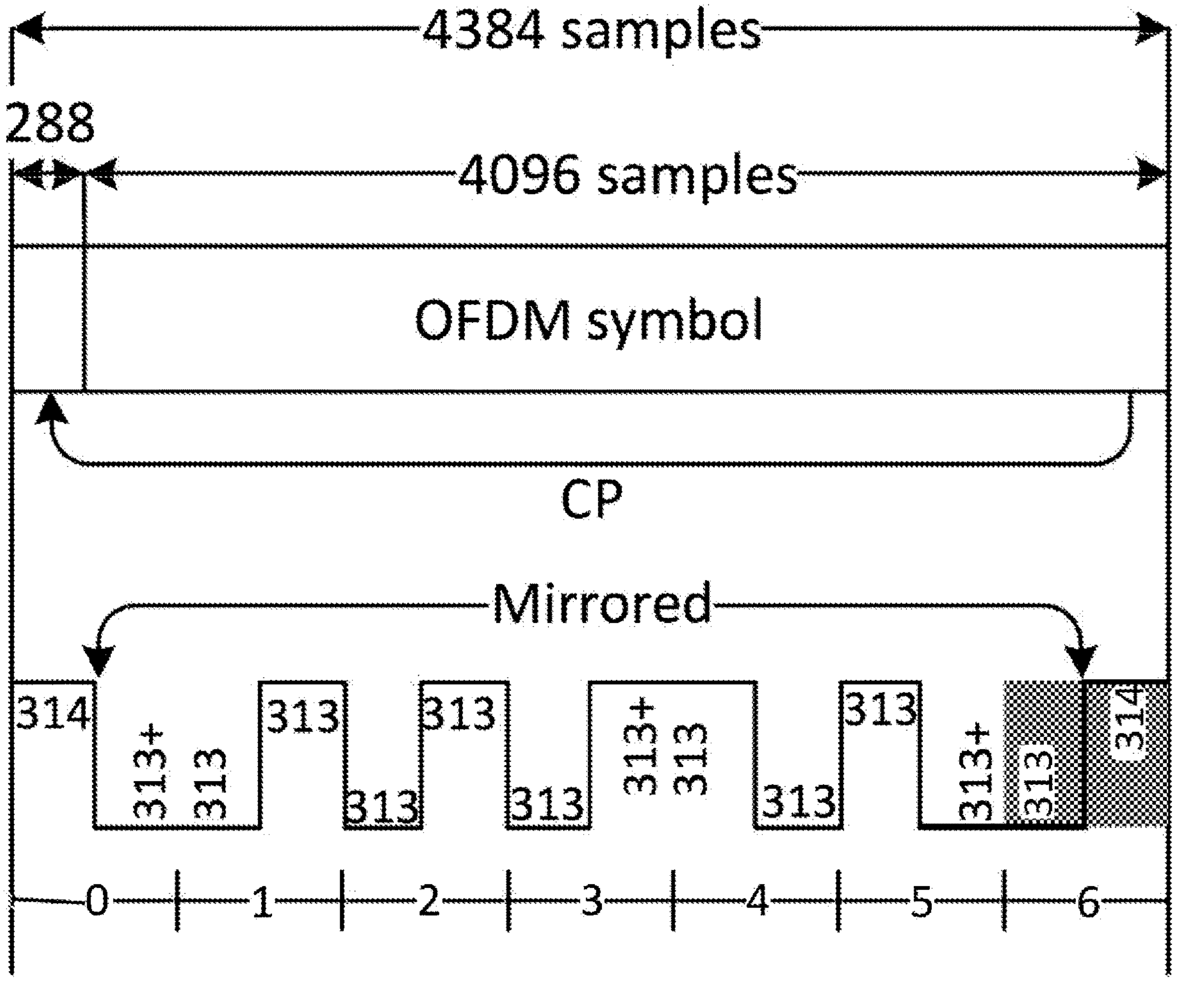
FIG. 12 illustrates an example with 7 OOK symbols per OFDM symbol in accordance with at least some example embodiments.

FIG. 12 illustrates an example with 7 OOK symbols per OFDM symbol in accordance with at least some example embodiments. The example illustrated in FIG. 12 may be related to use case B illustrated in FIG. 4 and comprise the same elements.

In this case, the symbol length of the CP adapted OOK symbol may be equal to or bigger than twice the CP length. This means that correct CP behaviour may be ensured if the first OOK symbol is a mirrored version of the last OOK symbol (assuming Manchester encoding). The timing illustrated in use case B may be used to maximize the number of OOK symbols per OFDM symbol, while still ensuring that the duration of the first half of OOK symbol 0 is equal to or bigger than CP and likewise the duration of the last half of the last OOK symbol is equal to or bigger than CP.

FIG. 12 shows an example where the number of OOK symbols per OFDM symbol has been further reduced to 7 OOK symbols per OFDM symbol. The method is still the same as in use case B, where the last OOK symbol is a mirrored version of OOK symbol 0. To fit the number of samples, the average OOK symbol length may need to be (4096+288)/7=626.3 samples. This may be distributed as 5 symbols of 626 samples and 2 symbols of 627.

Long CP handling may be performed to fit the number of samples in case of 15 kHz SCS and long CP, and in such a case the OOK symbol duration may need to be such that the first ON/OFF duration of first OOK symbol is 1420 samples equal to the CP length, 12 ON/OFF durations with 4*314 samples and 8*315 samples and the last ON/OFF duration of the last OOK symbol is 1420 samples equal to the CP length.

Figure 13:
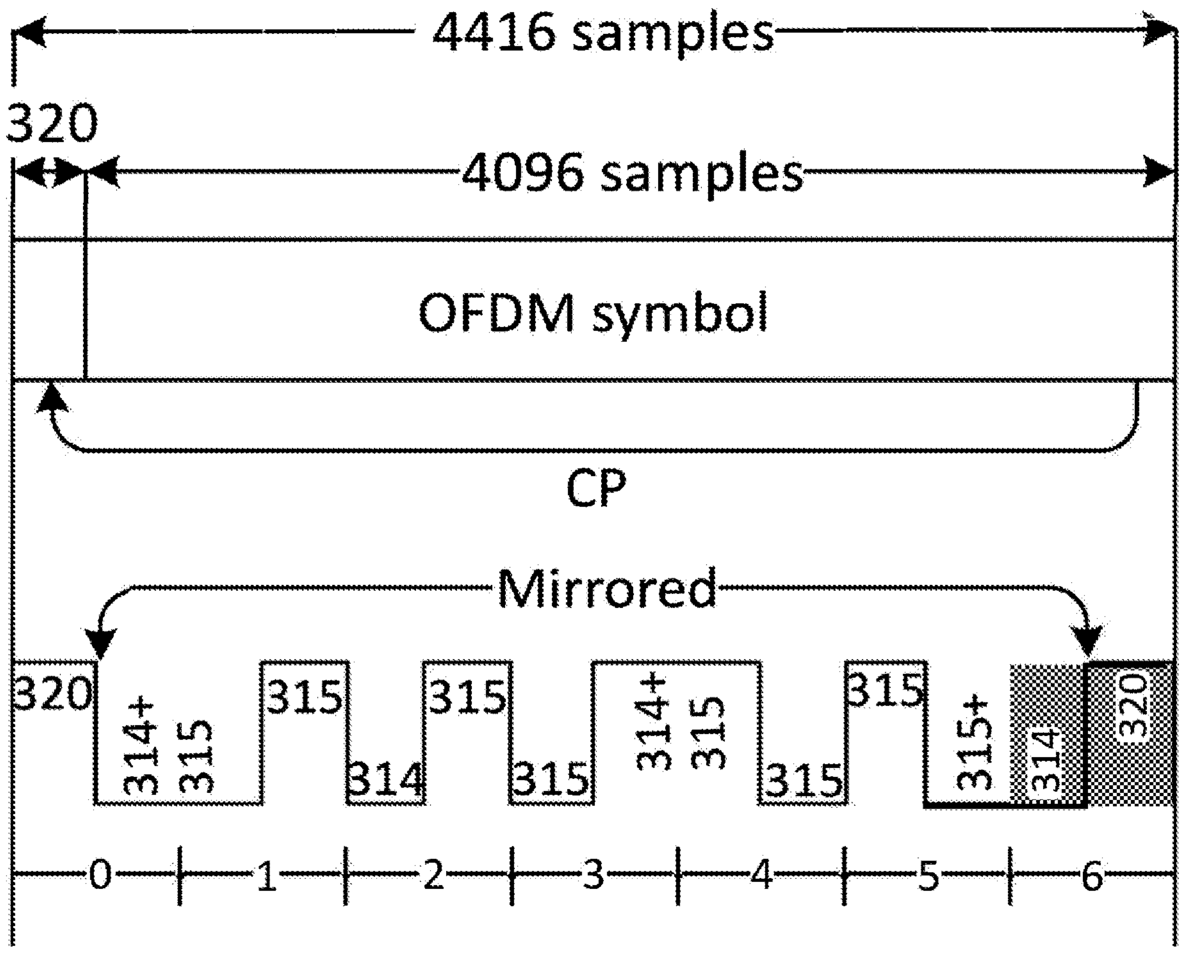
FIG. 13 illustrates an example with 7 OOK symbols per OFDM symbol using 15 kHz SCS and long CP in accordance with at least some example embodiments.

FIG. 13 illustrates an example with 7 OOK symbols per OFDM symbol using 15 kHz SCS and long CP in accordance with at least some example embodiments. More specifically, FIG. 13 shows an example of an OFDM symbol with OOK symbols according to the above distribution.

Concerning use cases C1 and C2, since the ideal OOK signal may be offset relative to the OFDM symbol such that the transition point inside the first OOK symbol aligns with the start of the CP field, it means that CP level may be inverted by delaying the transition until the end of the CP field. The delaying of the transition point may be done in case the default alignment does not fulfill the CP behavior. The delaying may continue for multiple symbols until the default alignment again conforms to the correct CP behavior.

The delaying of the transition point may be achieved by extending all the OOK symbols starting in the previous OFDM symbol thereby distributing the extension among multiple OOK symbols. Likewise, the transition point may be later re-aligned to the start of a CP field by shortening the OOK symbols in the previous OFDM symbol.

Example embodiments of the present disclosure therefore enable symbol generation ensuring compatibility with the CP insertion. This further ensures that the OOK signal, like a WUS signal, does not influence normal NR OFDM signals on other subcarriers.

Figure 14:
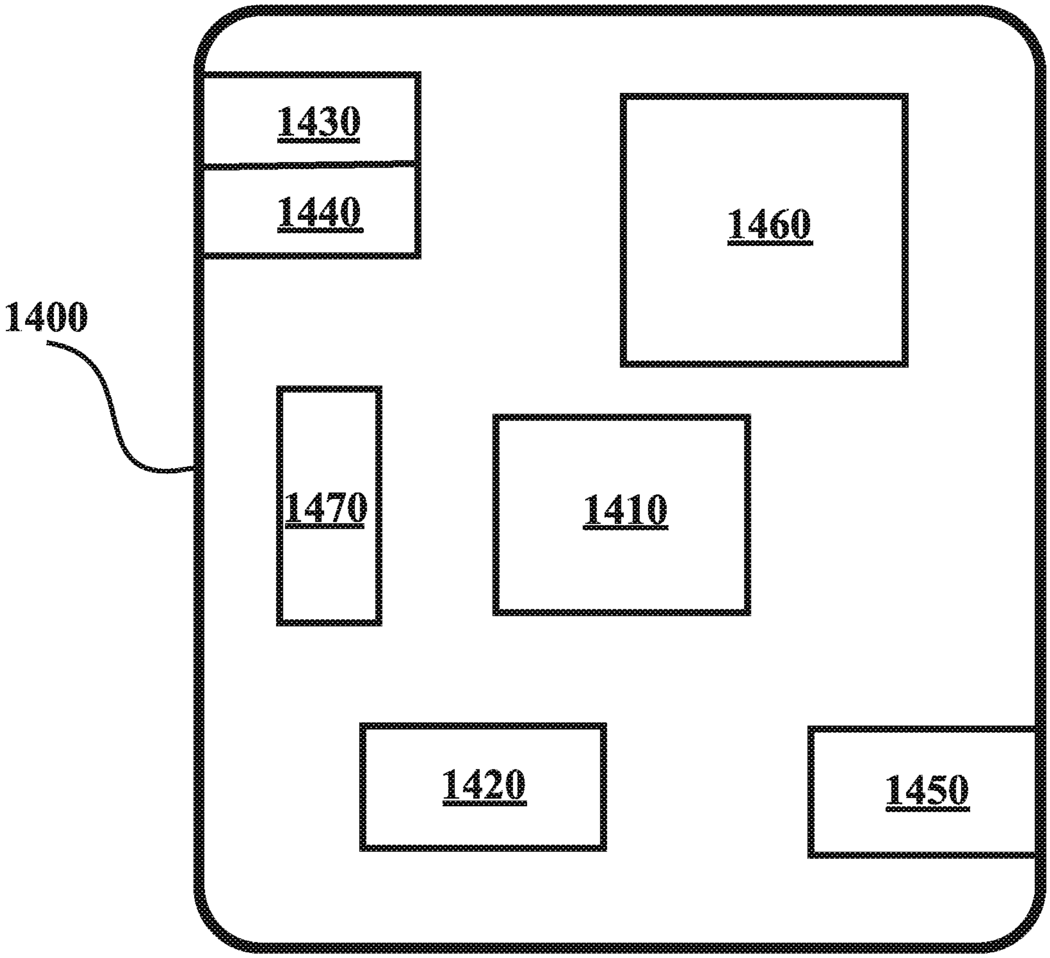
FIG. 14 illustrates an example apparatus capable of supporting at least some embodiments of the present disclosure.

FIG. 14 illustrates an example apparatus capable of supporting at least some embodiments of the present disclosure. Illustrated is device 1400, which may comprise, for example, UE 110, 120 or, in applicable parts, a base node 130 of FIG. 1A. Comprised in device 1400 is processor 1410, which may comprise, for example, a single- or multi-core processor wherein a single-core processor comprises one processing core and a multi-core processor comprises more than one processing core. Processor 1410 may comprise, in general, a control device. Processor 1410 may comprise more than one processor. When processor 1410 comprises more than one processor, device 1400 may be a distributed device wherein processing of tasks takes place in more than one physical unit. Processor 1410 may be a control device. A processing core may comprise, for example, a Cortex-A8 processing core manufactured by ARM Holdings or a Zen processing core designed by Advanced Micro Devices Corporation. Processor 1410 may comprise at least one Qualcomm Snapdragon and/or Intel Atom processor. Processor 1410 may comprise at least one application-specific integrated circuit, ASIC. Processor 1410 may comprise at least one field-programmable gate array, FPGA. Processor 1410 may be means for performing method steps in device 1400, such as storing, processing, switching, receiving, running, providing, and transmitting. Processor 1410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a UE or base node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 1400 may comprise memory 1420. Memory 1420 may comprise random-access memory and/or permanent memory. Memory 1420 may comprise at least one RAM chip. Memory 1420 may comprise solid-state, magnetic, optical and/or holographic memory, for example. Memory 1420 may be at least in part accessible to processor 1410. Memory 1420 may be at least in part comprised in processor 1410. Memory 1420 may be means for storing information. Memory 1420 may comprise computer instructions that processor 1410 is configured to execute. When computer instructions configured to cause processor 1410 to perform certain actions are stored in memory 1420, and device 1400 overall is configured to run under the direction of processor 1410 using computer instructions from memory 1420, processor 1410 and/or its at least one processing core may be considered to be configured to perform said certain actions. Memory 1420 may be at least in part comprised in processor 1410. Memory 1420 may be at least in part external to device 1400 but accessible to device 1400. Memory 1420 may be non-transitory. The term "non-transitory", as used herein, is a limitation of the medium itself (that is, tangible, not a signal) as opposed to a limitation on data storage persistency (for example, RAM vs. ROM).

Device 1400 may comprise a transmitter 1430. Device 1400 may comprise a receiver 1440. Transmitter 1430 and receiver 1440 may be configured to transmit and receive, respectively, information in accordance with at least one cellular or non-cellular standard. Transmitter 1430 may comprise more than one transmitter. Receiver 1440 may comprise more than one receiver. Transmitter 1430 and/or receiver 1440 may be configured to operate in accordance with global system for mobile communication, GSM, wideband code division multiple access, WCDMA, 5G, long term evolution, LTE, IS-95, wireless local area network, WLAN, and/or worldwide interoperability for microwave access, WiMAX, standards, for example. Transmitter 1430 and receiver 1440 together comprise a wireless transceiver, the main radio of the device.

Device 1400 may comprise a wireless receiver 1450. Wireless receiver 1450 may be configured to receive a wireless wake-up signal, for example using OOK, MC-OOK or multicarrier-frequency shift keying, MC-FSK. Wireless receiver 1450, which may be referred to as a wake-up signal wireless receiver, may be distinct from wireless transceiver 1430, 1440. An example architecture of wireless receiver 1450 is illustrated in FIG. 1B.

Device 1400 may comprise user interface, UI, 1460. UI 1460 may comprise at least one of a display, a keyboard, a touchscreen, a vibrator arranged to signal to a user by causing device 1400 to vibrate, a speaker and a microphone. A user may be able to operate device 1400 via UI 1460, for example to accept incoming telephone calls, to originate telephone calls or video calls, to browse the Internet, to manage digital files stored in memory 1420 or on a cloud accessible via transmitter 1430 and receiver 1440, or via NFC transceiver 1450, and/or to play games.

Device 1400 may comprise or be arranged to accept a user identity module 1470. User identity module 1470 may comprise, for example, a subscriber identity module, SIM, card installable in device 1400. A user identity module 1470 may comprise information identifying a subscription of a user of device 1400. A user identity module 1470 may comprise cryptographic information usable to verify the identity of a user of device 1400 and/or to facilitate encryption of communicated information and billing of the user of device 1400 for communication effected via device 1400.

Processor 1410 may be furnished with a transmitter arranged to output information from processor 1410, via electrical leads internal to device 1400, to other devices comprised in device 1400. Such a transmitter may comprise a serial bus transmitter arranged to, for example, output information via at least one electrical lead to memory 1420 for storage therein. Alternatively to a serial bus, the transmitter may comprise a parallel bus transmitter. Likewise processor 1410 may comprise a receiver arranged to receive information in processor 1410, via electrical leads internal to device 1400, from other devices comprised in device 1400. Such a receiver may comprise a serial bus receiver arranged to, for example, receive information via at least one electrical lead from receiver 1440 for processing in processor 1410. Alternatively to a serial bus, the receiver may comprise a parallel bus receiver.

Device 1400 may comprise further devices not illustrated in FIG. 3. For example, where device 1400 comprises a smartphone, it may comprise at least one digital camera. Some devices 1400 may comprise a back-facing camera and a front-facing camera, wherein the back-facing camera may be intended for digital photography and the front-facing camera for video telephony. Device 1400 may comprise a fingerprint sensor arranged to authenticate, at least in part, a user of device 1400. In some embodiments, device 1400 lacks at least one device described above.

Processor 1410, memory 1420, transmitter 1430, receiver 1440, wireless receiver 1450, UI 1460 and/or user identity module 1470 may be interconnected by electrical leads internal to device 1400 in a multitude of different ways. For example, each of the aforementioned devices may be separately connected to a master bus internal to device 1400, to allow for the devices to exchange information. However, as the skilled person will appreciate, this is only one example and depending on the embodiment various ways of interconnecting at least two of the aforementioned devices may be selected without departing from the scope of the present disclosure.

Figure 15:
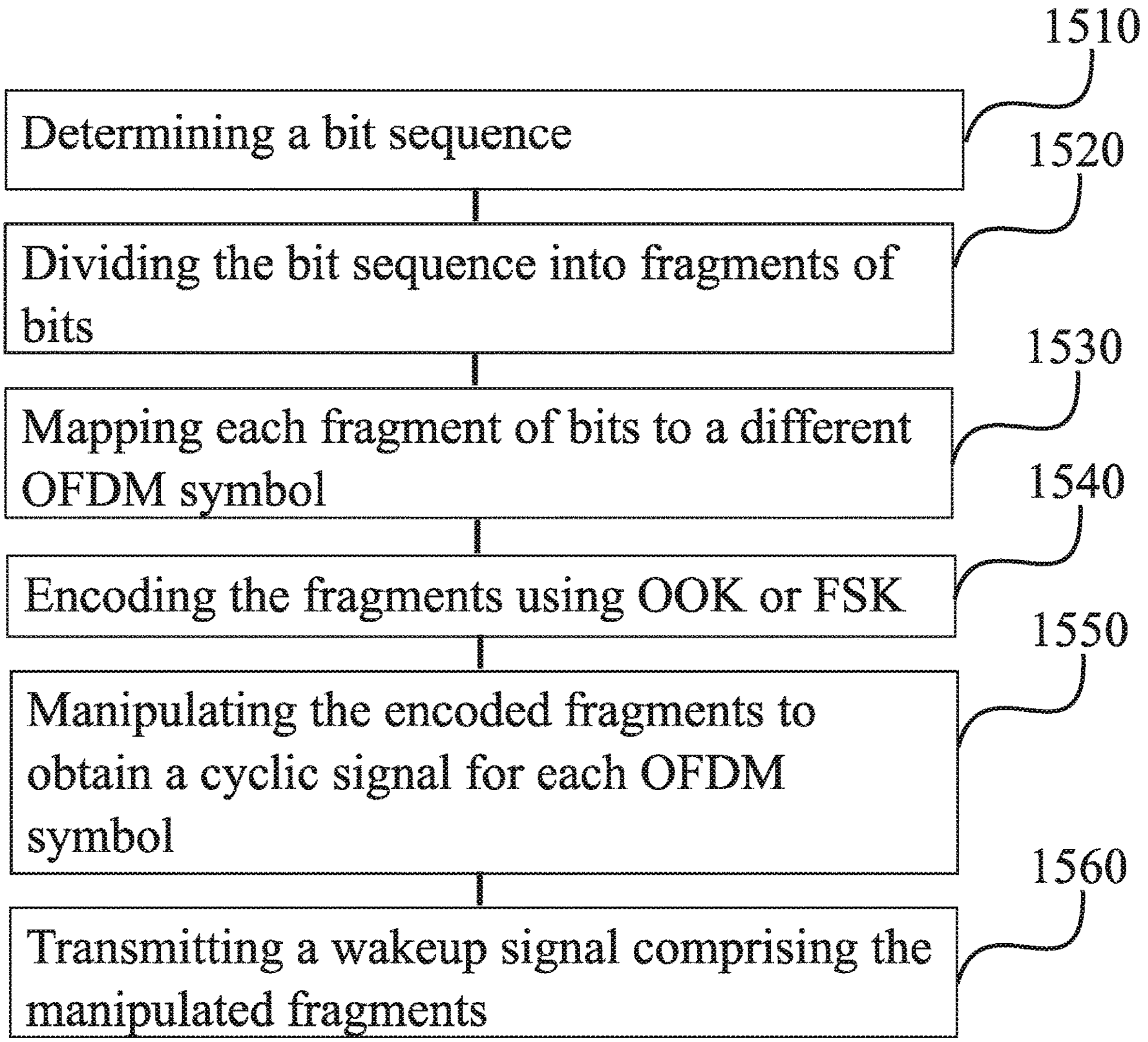
FIG. 15 is a flow graph of a first method in accordance with at least some embodiments of the present disclosure.

FIG. 15 is a flow graph of a first method in accordance with at least some embodiments of the present disclosure. The phases of the illustrated method may be performed in an apparatus such as base node 130, or in a control device configured to control the functioning thereof, when installed therein.

The first method may comprise, at step 1510, determining a bit sequence. The first method may further comprise, at step 1520, dividing the bit sequence into fragments of bits. The first method may further comprise, at step 1530, mapping each fragment of bits to a different OFDM symbol. The first method may further comprise, at step 1540, encoding the fragments using on-off keying or frequency shift keying. The first method may further comprise, at step 1550, manipulating the encoded fragments to obtain a cyclic signal for each OFDM symbol. Finally, the first method may comprise, at step 1560, transmitting a wakeup signal comprising the manipulated fragments.

In some example embodiments, the fragments may be the parts of the OOK or FSK sequence which are mapped to each OFDM symbol. For instance, if the bit sequence contains 12 OOK symbols and each OFDM symbol comprises 4 OOK symbols, then it becomes 3 fragments of 4 OOK symbols. In some of example embodiments, each fragment may have an extra symbol inserted and in some other example embodiment, each fragment may be stretched or shortened to ensure correct CP behaviour. In some example embodiments, an ideal bit sequence may be referred to as a bit sequence.

Figure 16:
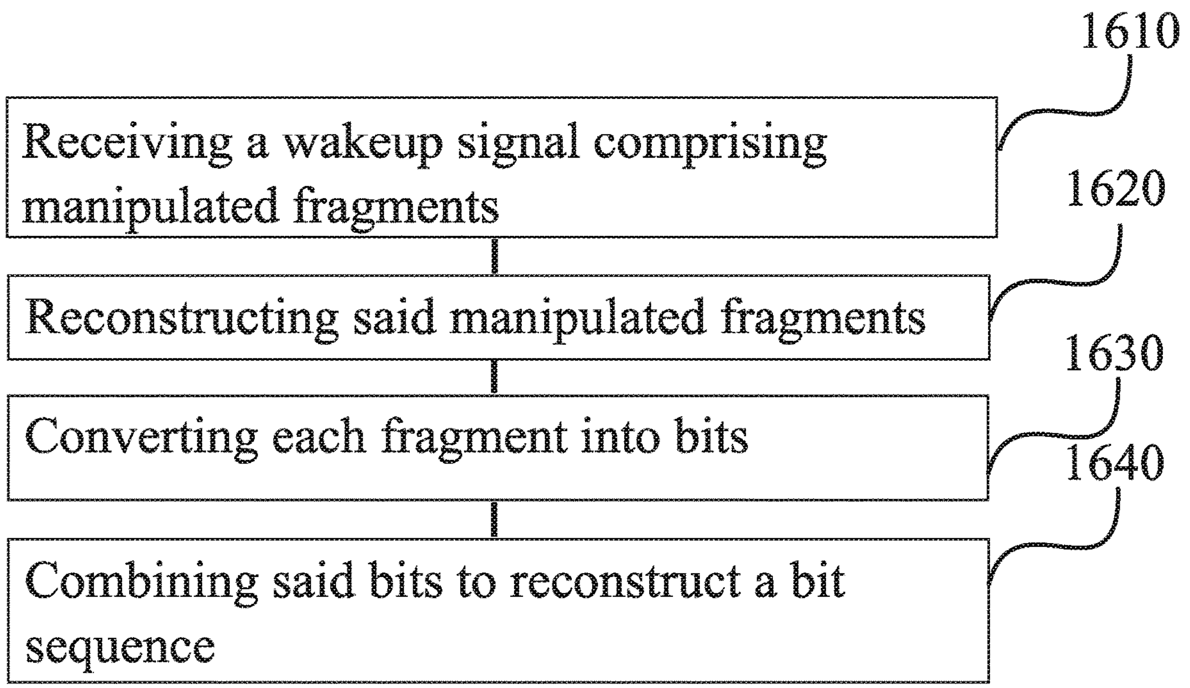
FIG. 16 is a flow graph of a second method in accordance with at least some embodiments of the present disclosure.

FIG. 16 is a flow graph of a second method in accordance with at least some embodiments of the present disclosure. The phases of the illustrated method may be performed in an apparatus such as UE 110, or in a control device configured to control the functioning thereof, when installed therein.

The second method may comprise, at step 1610, receiving a wakeup signal comprising manipulated fragments. The second method may further comprise, at step 1620, reconstructing said manipulated fragments. The second method may further comprise, at step 1630, converting each fragment into bits. Finally, the second method may comprise, at step 1640, combining said bits to reconstruct a bit sequence.

It is to be understood that the embodiments of the disclosure disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

In an example embodiment, an apparatus, such as, for example, UE 110, 120 or, in applicable parts, a base node 130, may comprise means for carrying out the example embodiments described above and any combination thereof.

In an example embodiment, a computer program may be configured to cause a method in accordance with the example embodiments described above and any combination thereof. In an example embodiment, a computer program product, embodied on a non-transitory computer readable medium, may be configured to control a processor to perform a process comprising the example embodiments described above and any combination thereof.

In an example embodiment, an apparatus, such as, for example, UE 110, 120 or, in applicable parts, a base node 130, may comprise at least one processing core and at least one memory storing instructions that, when executed by the at least one processing core, cause the apparatus at least to perform the example embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present disclosure find industrial application in managing wireless communication.

The invention claimed is:

1. An apparatus, comprising:

at least one processing core and at least one memory storing instructions that, when executed by the at least one processing core, cause the apparatus at least to:

determine a bit sequence;

divide the bit sequence into fragments of bits;

map each fragment of bits to a different orthogonal frequency division multiplexed (OFDM) symbol;

encode the fragments using Manchester encoded on-off keying (OOK) to generate fragments of a discrete Fourier transform-spread-orthogonal frequency division multiplexed wakeup signal that spans multiple OFDM symbols and crosses a cyclic prefix field between the multiple OFDM symbols;

manipulate the encoded fragments to obtain a cyclic signal for each OFDM symbol by applying, for each encoded fragment, a left cyclic shift to a pre-discrete-Fourier-transform vector of an OOK signal before a discrete Fourier transform operation by n elements, where n equals a ratio of a length of the cyclic prefix field to a length of a Fast Fourier Transform (FFT) window multiplied by a number of elements of the pre-discrete-Fourier-transform vector, and thereafter inserting the cyclic prefix field by copying a last part of the cyclically shifted encoded fragment, thereby placing OOK irregularities at an end of a corresponding OFDM symbol;

transmit a wakeup signal comprising the manipulated fragments.

2. The apparatus according to claim 1, wherein the left cyclic shift causes regular OOK behavior at a beginning of the corresponding OFDM symbol and causes the OOK irregularities to occur at the end of the corresponding OFDM symbol.

3. The apparatus according to claim 2, wherein each OOK symbol of the OOK signal has substantially a same length corresponding to a fraction of the FFT window length, wherein the fraction is selected from one, one-half, one-fourth, one-eighth, or one- sixteenth of the FFT window length, and wherein ON durations and OFF durations of the OOK signal have substantially the same length.

4. The apparatus according to claim 3, wherein the wakeup signal comprises a beacon including a sync word followed by a cell identifier, and wherein the cell identifier is contained in a payload that fits within one OFDM symbol such that no OOK irregularity occurs inside the payload.

5. The apparatus according to claim 4, wherein the stored instructions further cause, when executed by the at least one processing core, the apparatus at least to transmit, in a system information block, an indication of a selected wakeup signal generation method used to generate the manipulated fragments.

6. The apparatus according to claim 5, wherein the wakeup signal is generated to be compatible with cyclic prefix insertion such that the wakeup signal does not influence normal New Radio (NR) OFDM signals on other subcarriers.

7. The apparatus according to claim 6, wherein the selected wakeup signal generation method causes cyclic prefix fields of the wakeup signal to be copies of ends of respective OFDM symbols and causes the cell identifier to be transmitted without OOK irregularities inside the payload.

8. An apparatus, comprising:

at least one processing core and at least one memory storing instructions that, when executed by the at least one processing core, cause the apparatus at least to:

receive, using a low-power radio receiver comprising an envelope detector, an integrator, a comparator, and a correlator, a wakeup signal comprising manipulated fragments, wherein the low-power radio receiver is configured to detect the wakeup signal without using a mixer or advanced baseband processing, and without using an analogue-to-digital converter other than the comparator, wherein the wakeup signal is a Manchester-encoded OOK discrete Fourier transform-spread-orthogonal frequency division multiplexed wakeup signal that spans multiple OFDM symbols and crosses a cyclic prefix field between the multiple OFDM symbols, and wherein each manipulated fragment corresponds to a cyclic prefix field inserted after a left cyclic shift, by n elements, of a pre-discrete-Fourier-transform vector before a discrete Fourier transform operation, where n equals a ratio of a length of the cyclic prefix field to a length of a Fast Fourier Transform (FFT) window multiplied by a number of elements of the pre-discrete-Fourier-transform vector;

reconstruct said manipulated fragments by acquiring symbol synchronization, removing a last part of each OFDM symbol equal to the length of the cyclic prefix field, the last part containing OOK irregularities at an end of the OFDM symbol, ignoring or discarding the OOK irregularities, and cyclically shifting each fragment to reconstruct a corresponding encoded fragment;

convert each fragment into bits; and combine said bits to reconstruct a bit sequence.

9. The apparatus according to claim 8, wherein the low-power radio receiver further comprises an antenna, a band-pass filter, and a low-noise amplifier upstream of the envelope detector.

10. The apparatus according to claim 9, wherein the OOK irregularities occur periodically at a predictable interval, and wherein reconstructing said manipulated fragments comprises removing OOK symbols corresponding to the predictable interval and concatenating remaining OOK symbols to form a complete wakeup signal packet.

11. The apparatus according to claim 10, wherein the stored instructions further cause, when executed by the at least one processing core, the apparatus at least to receive, in a system information block, an indication of a selected wakeup signal generation method used to generate the manipulated fragments and reconstruct said manipulated fragments according to the selected wakeup signal generation method.

12. The apparatus according to claim 11, wherein the wakeup signal comprises a beacon including a sync word followed by a cell identifier, wherein the cell identifier is contained in a payload that fits within one OFDM symbol, and wherein reconstructing said manipulated fragments comprises ignoring or discarding the OOK irregularities at the end of the OFDM symbol after the payload.

13. The apparatus according to claim 12, wherein the correlator is configured to correlate a detected bit sequence with the sync word to determine a symbol boundary of the wakeup signal.

14. The apparatus according to claim 13, wherein the stored instructions further cause, when executed by the at least one processing core, the apparatus at least to combine bits of the payload to recover the cell identifier.

15. The apparatus according to claim 14, wherein the comparator is configured to determine whether a received symbol is a zero or a one by comparing, for each symbol duration, an integrated signal level from the integrator with an average signal level.

16. A method for communication, comprising:

receiving a wakeup signal comprising manipulated fragments using a low-power radio receiver by envelope detecting the wakeup signal, integrating the envelope-detected signal over each symbol duration, comparing an integrated signal level with an average signal level to detect symbols, and correlating a detected bit sequence with an expected signal, wherein the wakeup signal is detected without using a mixer or advanced baseband processing, and without using an analogue-to-digital converter other than the comparator, wherein the wakeup signal is a Manchester-encoded OOK discrete Fourier transform-spread-orthogonal frequency division multiplexed wakeup signal that spans multiple OFDM symbols and crosses a cyclic prefix field between the multiple OFDM symbols, and wherein each manipulated fragment corresponds to a cyclic prefix field inserted after a left cyclic shift, by n elements, of a pre-discrete-Fourier-transform vector before a discrete Fourier transform operation, where n equals a ratio of a length of the cyclic prefix field to a length of a Fast Fourier Transform (FFT) window multiplied by a number of elements of the pre-discrete-Fourier-transform vector;

reconstructing said manipulated fragments by acquiring symbol synchronization, removing a last part of each OFDM symbol equal to the length of the cyclic prefix field, the last part containing OOK irregularities at an end of the OFDM symbol, ignoring or discarding the OOK irregularities, and cyclically shifting each fragment to reconstruct a corresponding encoded fragment;

converting each fragment into bits; and combining said bits to reconstruct a bit sequence.

17. The method according to claim 16, wherein correlating the detected bit sequence with the expected signal comprises correlating the detected bit sequence with a wake-up signal identity to determine whether the user equipment is configured to respond to the wakeup signal.

18. The method according to claim 17, wherein the OOK irregularities occur periodically at a predictable interval, and wherein reconstructing said manipulated fragments comprises removing OOK symbols corresponding to the predictable interval and concatenating remaining OOK symbols to form a complete wakeup signal packet.

19. The method according to claim 18, wherein the wakeup signal comprises a beacon including a sync word followed by a cell identifier, wherein the cell identifier is contained in a payload that fits within one OFDM symbol, and wherein reconstructing said manipulated fragments comprises ignoring or discarding the OOK irregularities at the end of the OFDM symbol after the payload.

20. The method according to claim 19, wherein correlating the detected bit sequence with the expected signal comprises correlating the detected bit sequence with the sync word to determine a symbol boundary of the wakeup signal, and wherein combining said bits to reconstruct the bit sequence comprises combining bits of the payload to recover the cell identifier.

* * * * *